United States Patent
Bäumer et al.

(10) Patent No.: US 6,408,888 B1
(45) Date of Patent: Jun. 25, 2002

(54) ENERGY CONDUCTING GUIDE CHAIN

(75) Inventors: Jürgen Bäumer, Siegen; Herbert Wehler, Neunkirchen; Werner Eul, Troisdorf, all of (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 09/538,462

(22) Filed: Mar. 30, 2000

(30) Foreign Application Priority Data

Apr. 1, 1999 (DE) .......................................... 199 15 035

(51) Int. Cl.[7] .......................... F16L 11/00; F16G 13/00; F16G 13/10
(52) U.S. Cl. .......................... 138/120; 474/211; 59/78.1
(58) Field of Search ................................. 474/144, 146, 474/147, 211; 59/78.1, 84, 900; 138/120, 118, 121; 4/623

(56) References Cited

U.S. PATENT DOCUMENTS

| | | | |
|---|---|---|---|
| 989,539 A | * | 4/1911 | Seeberger .................... 474/211 |
| 1,276,117 A | * | 8/1918 | Riebe ....................... 138/120 X |
| 4,739,801 A | | 4/1988 | Kimura et al. |
| 5,635,675 A | * | 6/1997 | Houga ...................... 59/78.1 X |
| 6,029,293 A | * | 2/2000 | Paterson et al. ................ 4/623 |
| 6,164,570 A | * | 12/2000 | Smeltzer ................. 138/120 X |

FOREIGN PATENT DOCUMENTS

| | | |
|---|---|---|
| DE | 196 17 900 A1 | 12/1996 |
| JP | 2163545 | * 6/1990 |

* cited by examiner

Primary Examiner—Thomas R. Hannon
Assistant Examiner—Marcus Charles
(74) Attorney, Agent, or Firm—Alston & Bird LLP

(57) ABSTRACT

A modular energy conducting guide chain, which is composed of a plurality of serially arranged and interconnected guide elements. A terminal mounting element is joined at one or both ends of the interconnected guide elements, and a hollow guide section is connected to the terminal mounting element. The guide elements each comprise a generally tubular body which is composed of first and second guide sections which have the configuration of a segment of a sphere, and an intermediate joint section which may be flexible. To couple the adjacent guide elements in the chain, the first spherical guide section of one of the adjacent guide elements is positioned to overlie the second spherical guide section of the other of the adjacent guide elements, so as to permit relative rotation therebetween.

22 Claims, 20 Drawing Sheets

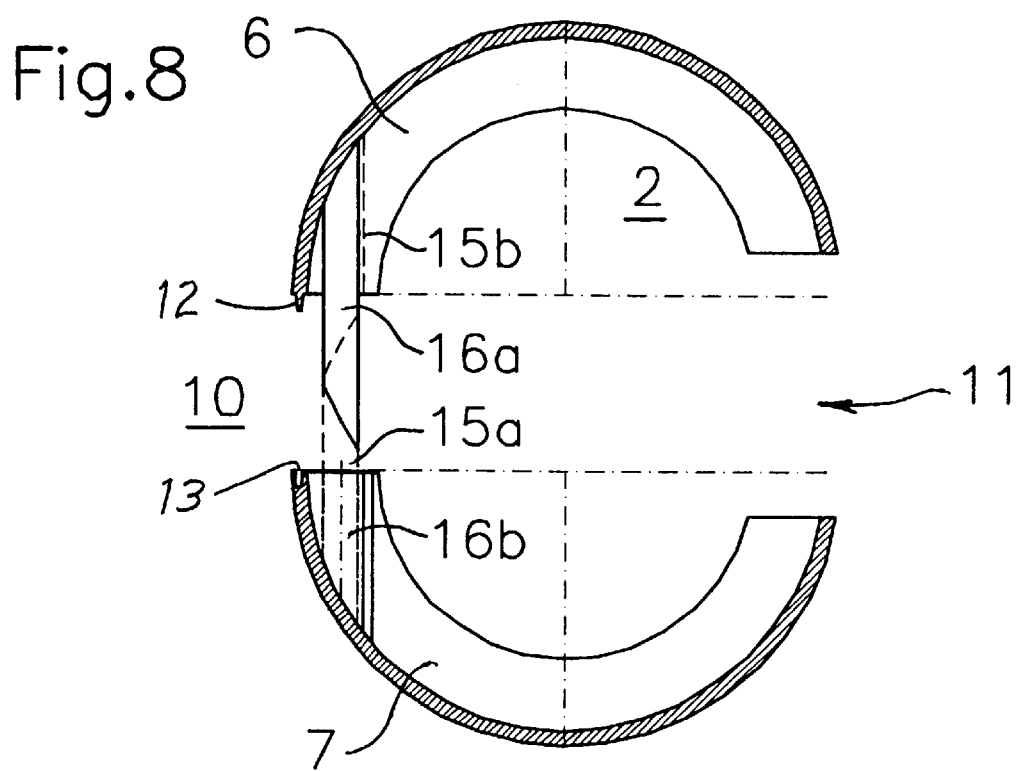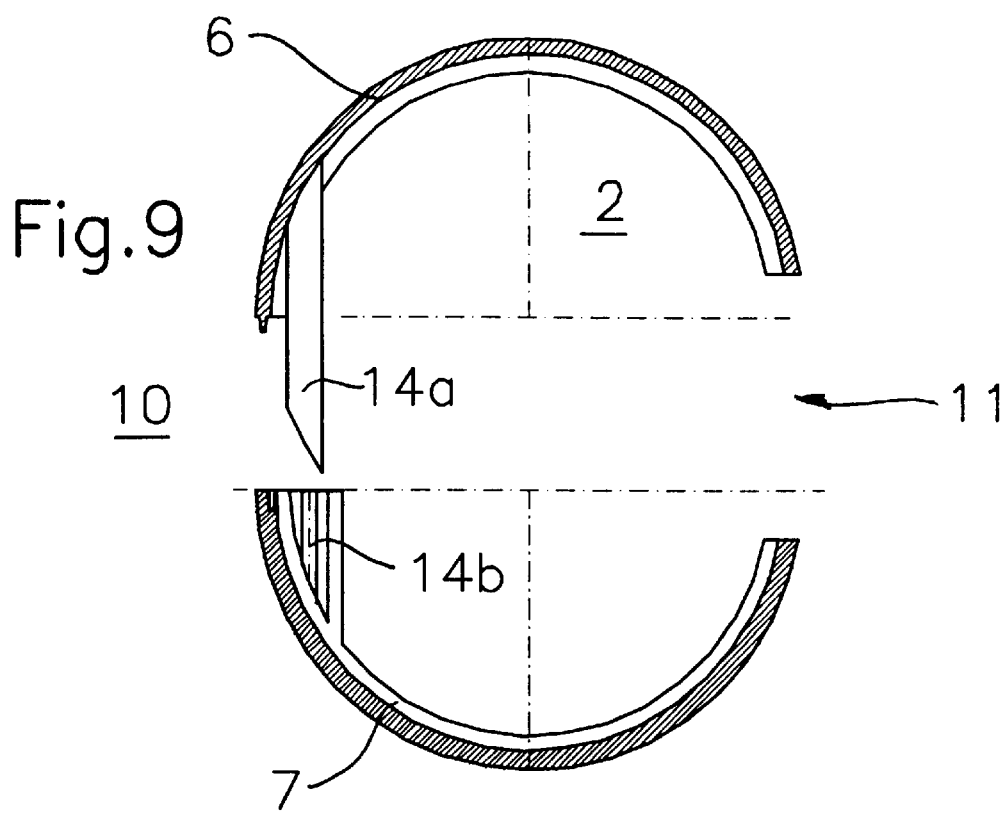

ENERGY CONDUCTING GUIDE CHAIN

BACKGROUND OF THE INVENTION

The present invention relates to a guide element for an energy conducting guide chain, as well as a terminal mounting element for attaching the chain formed by the guide elements to a junction point, and a modular system which includes the chain.

Modern operating machines are often connected to a plurality of electric, hydraulic, and/or pneumatic incoming and outgoing lines, for controlling movable consumers, whether they perform static and/or dynamic operations. To run such lines, in particular from a stationary junction point to a movable consumer, it is common to use so-called line guide elements which are interconnected to form an energy conducting guide chain.

Likewise, modern work places, in particular open-plan offices of industry, administration, and commerce, require, for example, energy and telecommunication connections in the direct vicinity of each work place, in particular grounded outlets for electronic devices, for telephone, and for computers, light switches, automatic circuit breakers, overvoltage protectors, and many more.

In the case of office furniture, such as desks and computer tables, or in the case of special furniture for sound and movie studios, it is known to use conduits for purposes of running and laying in a defined manner current-carrying and/or other supply cables (also referred to herein as lines) to electrical or electronic devices placed or mounted on the furniture, so that the cables are not exposed. Such conduits are used both for protecting the cables and for protecting the operator of the devices. Moreover, such cable conduits prevent a device from being pulled down from the furniture in the case of tripping over or getting caught on the cable.

Based on the foregoing, it is an object of the present invention to provide line guide elements, a guide chain formed of the elements, a terminal mounting element for the guide chain, as well as a modular system for forming a line guide structure for running at least one line. The components are easy to handle, small in number, and able to fulfil a number of energy supply situations, in particular electrification situations. In addition, it is intended to make it possible to insert the at least one cable into the guide elements even after assembly of the components, and without tools. Moreover, it is intended to cover different cases of use with static and/or dynamic loads. Furthermore, it is intended to be able to integrate possibly previously existing components, such as, for example, hollow guide sections with a substantially circular or rectangular cross section, as well as trays for depositing multipoint connectors, or the like.

SUMMARY OF THE INVENTION

The above and other objects and advantages of the invention are achieved by the provision of a guide element for an energy conducting guide chain which comprises a generally tubular body which defines a longitudinally extending central guide area which is adapted to receive at least one energy conducting line. The guide element includes first and second longitudinally aligned guide sections which are joined by an intermediate joint section. Preferably, the first and second guide sections have the configuration of a segment of a sphere.

To form a guide chain, several of the guide elements are serially arranged, and the adjacent guide elements are coupled together by a coupling wherein the first guide section of one of the adjacent guide elements is coupled to the second guide section of the other of the adjacent guide elements. Such coupling is achieved by having the spherical first guide section overlie the spherical second guide section, and so as to permit relative rotation about the longitudinal axis.

The formation of a joint section between the two guide sections permits a high constructional degree of freedom. Moreover, wear of the joints is minimized insofar as it is possible to use the guide element of the invention in an advantageous manner, for guiding a cable even in manufacturing processes under clean room conditions or for electrification of, for example, therein needed work or inspection stations.

It is preferred to fabricate each guide element from two halves, i.e., first and second longitudinal halves, each having preferably the shape of a half shell, thereby facilitating in an advantageous manner its manufacture and assembly. The two longitudinal halves each define a pair of longitudinal edges, and the edges along one or both sides may be brought together and joined to form joining regions.

Where the two longitudinal halves have two joining regions, the two halves form a tubular guide element after being assembled, which fully encloses the central guide area. In this instance, the lines may be inserted initially during the assembly of the guide elements to form a guide chain through the front end openings of the guide elements.

As an alternative, the two longitudinal halves may have only one joining region along one side, so that after being joined, they form a generally tubular guide element, which substantially encloses the guide area but includes a continuous slot extending in the longitudinal direction of the guide element, so that in an advantageous manner the slot permits the lines to be inserted into the guide area even after the assembly is completed.

In a particularly simple construction, the two longitudinal halves can be joined in their joining region or regions by a tongue and groove connection.

To reinforce the structure of a guide element having only one joining region, it is proposed to provide the longitudinal halves, adjacent their one joining region, with at least one connecting means that reinforces the structure of the guide element. Preferably, the connecting means take the form of a pin on one longitudinal half, and which engages a corresponding receptacle in the other longitudinal half. In the simplest case, the connecting means may be a screw.

It will be possible to manufacture the guide elements in a particularly economical manner, when both the guide sections and the intermediate joint section of the longitudinal halves are formed of a plastic. Preferably, the intermediate joint section is composed of a material differing from the plastic of the guide sections, in particular of a softer material, which advantageously assists in the flexibility of the joint sections.

An advantageous development provides that the guide sections are molded to the intermediate joint section by the bicomponent injection molding method.

To improve a material-to-material engagement between the guide and joint sections, it is proposed to provide cavities or grooves in the joint section for molding thereto the guide sections in material-to-material engagement.

To improve the flexibility of the joint section, it is proposed to make the joint section at least in part elastic.

To further increase the flexibility, it is preferred to make the joint section in the fashion of an accordion. An accordion-type joint section provides with simple means higher degrees of freedom with respect to the possibility of turning adjacent guide sections relative to one another.

A guide chain formed from such guide elements for running at least one line distinguishes itself in that the first and the second guide section of adjacent guide elements can be interconnected in formfitting and/or force-locking or frictional engagement. This permits forming in an advantageous manner guide chains of any desired length.

Preferably, for example by simply joining the first or the second guide section of adjacent guide elements, the one element engages the other. This has the advantage that a guide chain is constructed without additional connecting elements that are possibly subjected to wear.

To improve the force-locking engagement and/or the formfitting or frictional engagement, the guide sections are designed and constructed, preferably to correspond with one another, in particular in the shape of a segment of a sphere.

Preferred is a construction of a guide chain, whose elements can be turned or twisted relative to one another, thereby enabling in an advantageous manner even complex sequences of motion of, for example, 360°.

To limit the angle of twist or traverse, at least individual guide elements may comprise restraining means. In a simple development, it is proposed to design and construct the restraining means as a pin-shaped element, which represents a stop. An advantageous further development proposes to design and construct the restraining means by the tongue and groove principle, preferably in such a manner that of two guide sections, the one comprises a pin-shaped element, which forms not only a stop, but also engages a corresponding groove formed in the adjacent guide section, so that it is possible to predetermine in an advantageous manner maximal angles of twist or traverse. Another advantageous further development of the restraining means provides for arranging in the groove evenly spaced recesses, which cooperate, for example, with a thrust ball arranged on the restraining element, so that it is possible to predetermine in an advantageous manner a plurality of intermediate angles, for example, at defined distances of 10° or 15°.

The filling, i.e. the insertion of the at least one line in the guide chain occurs, if not during the assembly of the guide chain, then subsequently through the longitudinal slots in the guide elements. Thereafter, the guide chain can be closed simply by twisting the elements. In like manner, it is easy to remove the line.

The terminal mounting element of the present invention, which defines a guide area and is used to mount a guide chain formed from the guide elements to a junction point, includes a coupling section, which can be connected to a first or a second guide section of the guide element in formfitting and/or force-locking or frictional engagement.

The line exits from the junction point. Known junction points are normally located on ceilings, walls, or floors. However, even machines or a hollow guide section may comprise junction points, to which the terminal mounting element can be attached in an advantageous manner. Thus, the terminal mounting element enables in an advantageous manner an attachment of the guide chain, for example, to the floor, below a table top, or even to any other preferably flat surface.

Preferably, for example, by simply joining the coupling section of the terminal mounting element and the first or the second guide section, the one engages the other. This has the advantage that likewise the connection of a terminal mounting element to a guide chain occurs without additional connecting elements that are possibly subjected to wear.

Therefore, the coupling section is designed and constructed, preferably to correspond with the first or second guide section, in particular likewise in the shape of a spherical segment, thereby improving in a particularly advantageous manner the force-locking engagement and/or formfitting or frictional engagement.

Preferred is the construction of a terminal mounting element, which permits turning or twisting the guide sections of the guide chain relative to the coupling section, thereby enabling even complex sequences of motion at, for example, 360° in an advantageous manner over the entire length of the guide chain. To limit the angle of twist or traverse, the coupling section and/or the guide sections may comprise the previously described restraining means.

Preferably, the coupling section comprises at least one slot extending in the longitudinal direction of the terminal mounting element. This slot facilitates the interlocking assembly of the coupling section with a first or a second guide section. In like manner as their own assembly to a guide chain, guide sections with a longitudinal slot can thus engage the coupling section in a possibly simple manner via the at least one slot.

For positioning the terminal mounting element on or over a junction point, the end of the element opposite to the coupling section includes a preferably flat or flangelike, substantially radially outward directed collar.

For a damage-free positioning of a terminal mounting element over a junction point extending in a substantially horizontal surface, it is proposed that the terminal mounting element contains a material of a high specific density, preferably lead or lead glance, bronze, gray iron, or the like, thereby ensuring in an advantageous manner a lasting positioning of the terminal mounting element, in particular over a floor junction point. The damage-free positioning of a weighted terminal mounting element has the advantage that the region surrounding a junction point is not damaged, for example, by a screw connection, but continues to remain sightly, for example, after relocating a work place that is to be supplied via a different junction point.

Alternatively and/or cumulatively, in particular in hazardous stumbling regions, it is preferred to form on the circumference of the collar openings, which are, for example, equally spaced from one another, in particular at a same phase angle, and enable an attachment of the terminal mounting element, for example, by means of screws or, in cooperation with detents adjacent the junction point, to an even vertically arranged junction point with a preferably flat surface.

It is preferred to design and construct a mounting element with a rectangular collar. Such a collar facilitates in particular an attachment to junction points, which comprise special clamping and/or holding means, for example, clamping lips. For junction points with a substantially circular cross section, it is preferred to use mounting elements with a circular collar.

The modular system of the present invention for constructing a line guide arrangement for running at least one line comprises guide chains formed by guide elements, terminal mounting elements, and/or hollow guide sections with a substantially circular or rectangular cross section.

The modular system of the present invention has the advantage that it covers, both in the horizontal and in the vertical direction, inexpensively, with only few components, a plurality of supply situations by means of lines, for example, electrification projects. It can be produced in any mass color. Everything is possible, from modern variants to the combination of differently colored modules. In particular, the plurality of combination possibilities of the individual line guide elements, which may be individually composed for any situation, offers a suitable solution to almost any application. The modular system of the present invention is able to solve even different cases of application with static and/or dynamic load, wherein even complex sequences of motion are possible, for example, with turns of 360°. Naturally, almost any desired combination of rigid and flexible line guide elements is possible. Even possibly existing components, such as, for example, hollow sections or trays for depositing multipoint connectors, or the like, may be integrated into the modular system. Finally, the modular system is adaptable by different cross sections to quantities and thicknesses of the cables being laid.

Preferably, the modular system includes means for relieving the pull of the at least one cable. The pull of cables can be relieved either via a comb-like element with cable binding means, for example, in the adapter, or via an insert for the connecting elements.

Preferably, the modular system comprises a hollow guide section with a substantially rectangular cross section, which includes means for securing a terminal mounting element, preferably clamping lips.

Alternatively and/or cumulatively, the modular system may comprise at least one adapter, in particular with at least one substantially flat surface for attaching a terminal mounting element to a hollow guide section with a substantially circular cross section.

In particular the adapter, but also the terminal mounting element in the case of hollow guide profiles with a substantially rectangular cross section, are used as a connecting link between a vertical and a horizontal cable run. Their assembly occurs by simply hanging or, in the case of a rectangular hollow guide section with the advantageous clamping lips, by simply sliding the elements into the section. Their construction permits positioning them in an infinitely variable manner in the horizontal direction. Likewise, it is simple to arrange the guide chain on the adapter or the terminal mounting element, for example, by joining the flange connections. A rigid connection results, after interlocking and/or engagement in the case of detents.

As a result of the unit construction of such a modular system, it is possible to change parts as desired and to expand the system as such, along with increasing needs, at any time. Its handling is just as simple as its construction. To insert the cables in use, no tool will be needed and only a short time. Unique in a system of this kind is also the fact that it is possible to run the cables separated from one another in a closed system.

In like manner, the invention is suitable for use in furniture, for example, in offices or sound studios, as well as in static and/or dynamic machines or industrial plants, in particular in clean rooms, and it distinguishes itself by its flexibility as well as its compatibility even with existing systems.

In the following, the invention is described with reference to an embodiment for the office furniture industry, without however limiting the use of the invention thereto.

BRIEF DESCRIPTION OF THE DRAWINGS

FIG. 8 is a sectional bottom view of the longitudinal halves of FIG. 7 along a line III—III with only one joining region and reinforcing means;

FIG. 9 is a sectional top view of the longitudinal halves of FIG. 7 along a line IV—IV with only one joining region and reinforcing means;

DETAILED DESCRIPTION OF THE PREFERRED EMBODIMENTS

Figure 1:
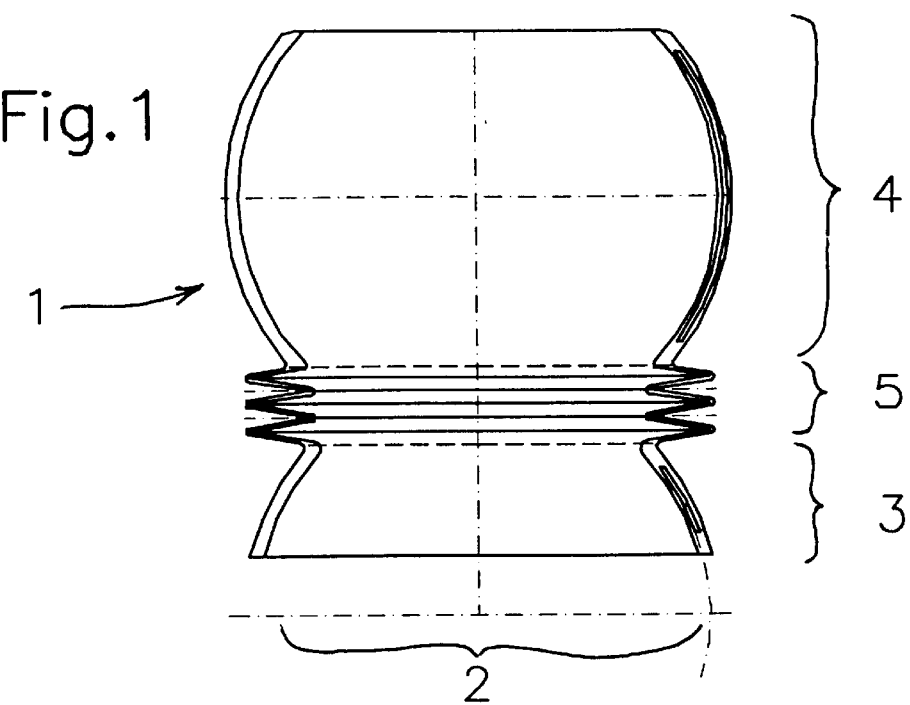
FIG. 1 is a front view of a guide element which embodies the present invention.

Referring more particularly to the drawings, FIG. 1 is a front view of a guide element 1, which defines a longitudinally (i.e., axially) extending central guide area 2. The guide element 1 comprises respectively a first guide section 3 and a second guide section 4 which are longitudinally aligned, as well as a joint section 5 formed therebetween.

Figure 2:
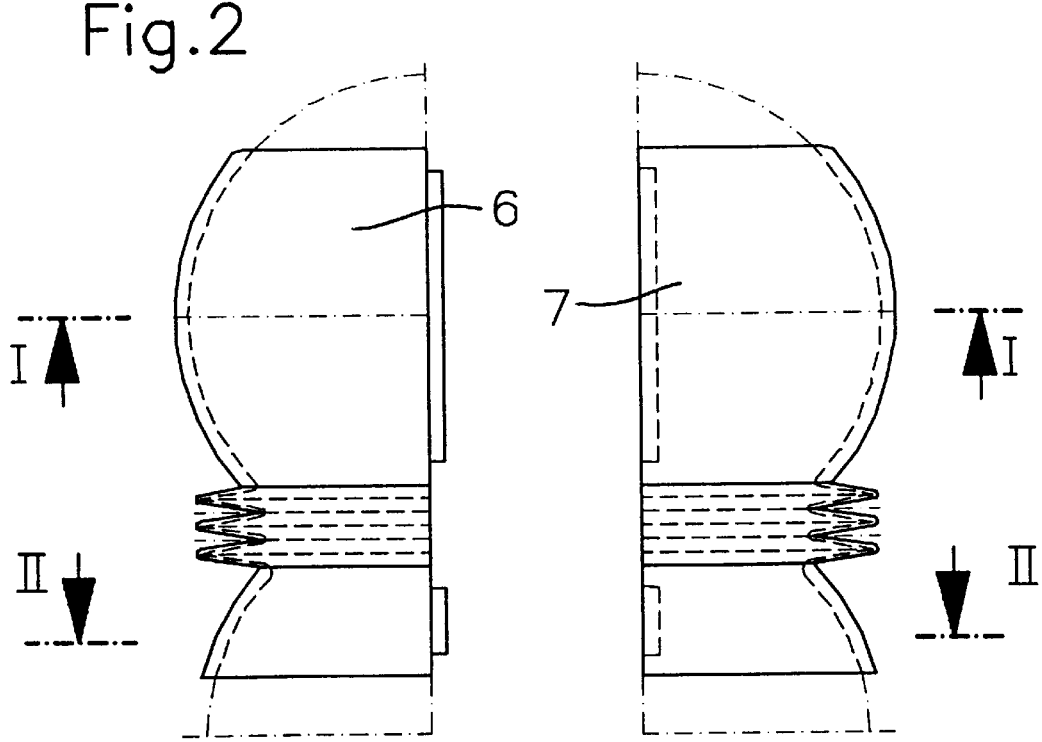
FIG. 2 is a view of two longitudinal halves of a guide element according to FIG. 1.

FIG. 2 shows a first longitudinal half 6 and a second longitudinal half 7, which result, when joined, in the guide element 1 of FIG. 1.

Figure 3:
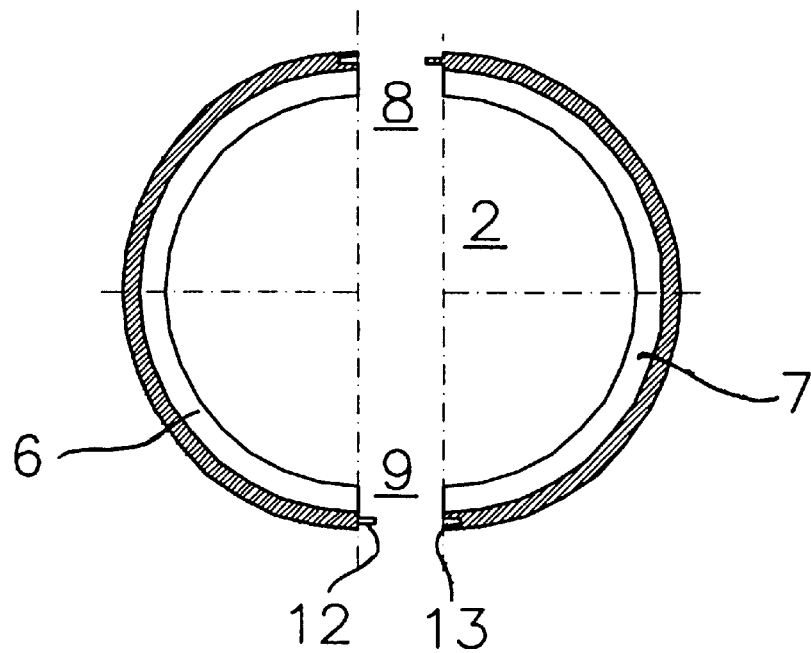
FIG. 3 is a sectional bottom view of the longitudinal halves of FIG. 2 along a line I—I with two joining regions.
Figure 4:
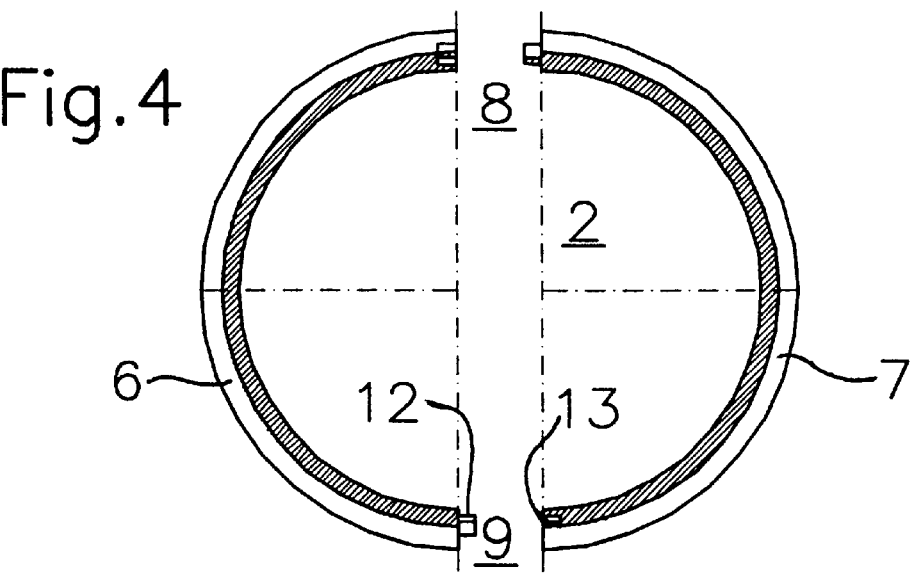
FIG. 4 is a sectional top view of the longitudinal halves of FIG. 2 along a line II—II of an embodiment having two joining regions.

FIGS. 3 and 4 are respectively a sectional bottom view and a sectional top view of the longitudinal halves 6 and 7 of FIG. 2 respectively along a line I—I and a line II—II. Each of the two longitudinal halves 6 and 7 define a pair of longitudinal edges, and the respective pairs of edges are brought together to form joining regions 8 and 9, so that after their assembly they form a unitary guide element which fully encloses the guide area 2. The assembly of the two longitudinal halves 6 and 7 in their joining regions 8 and 9 occurs by the tongue and groove connection. To this end, as shown in FIG. 3 and 4 respectively, a tongue 12 and a groove 13 are formed in each of the two joining regions 8 and 9.

Figure 5:
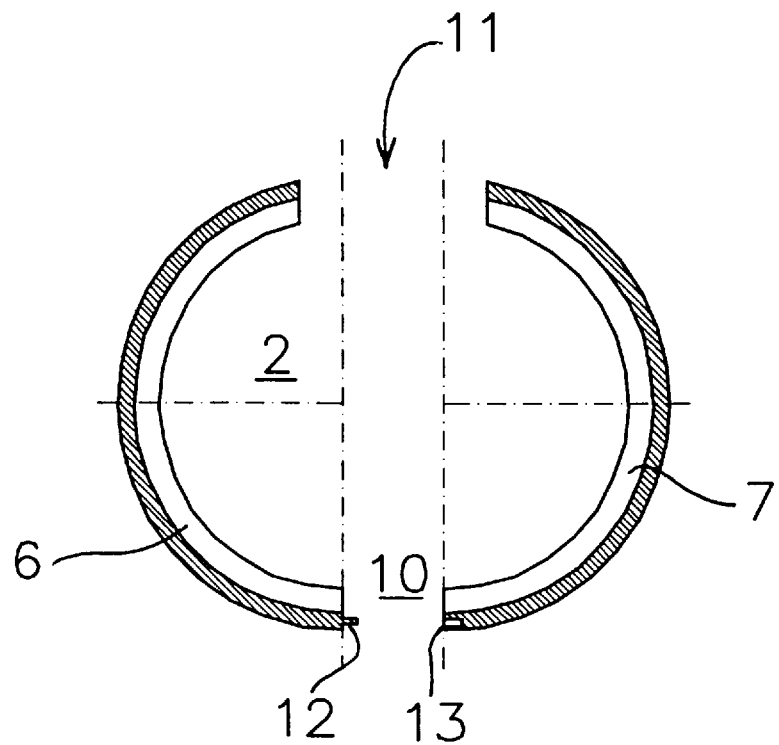
FIG. 5 is a sectional bottom view of the longitudinal halves of FIG. 2 along a line I—I of an embodiment having only one joining region.
Figure 6:
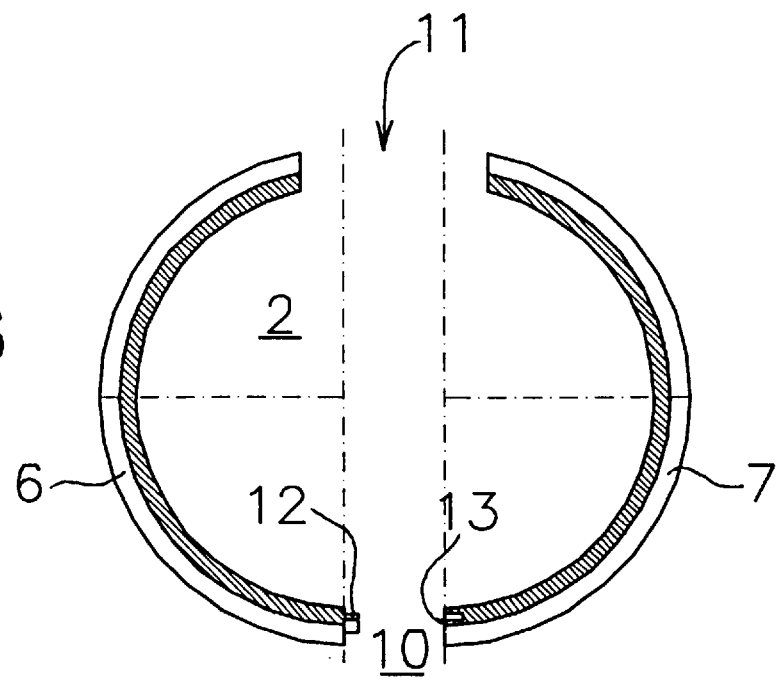
FIG. 6 is a sectional top view of the longitudinal halves of FIG. 2 along a line II—II of an embodiment having only one joining region.

In an alternative embodiment of the longitudinal halves 6 and 7, FIGS. 5 and 6 show a bottom view and a top view respectively of the longitudinal halves of FIG. 2 along a line I—I and a line II—II respectively. The two longitudinal halves 6 and 7 have each only one joining region 10, so that after their assembly, they form a guide element which has a continuous slot 11 extending in the longitudinal direction of the guide element and which communicates with the guide area 2. With that, it is possible to insert at least one cable into the guide area 2. Preferably, the joining of the two longitudinal halves 6 and 7 in their one joining region 10 occurs preferably again by the tongue and groove principle. To this end, as shown in FIGS. 5 and 6 respectively, a tongue 12 and a groove 13 are formed in the respective joining region 10.

Figure 7:
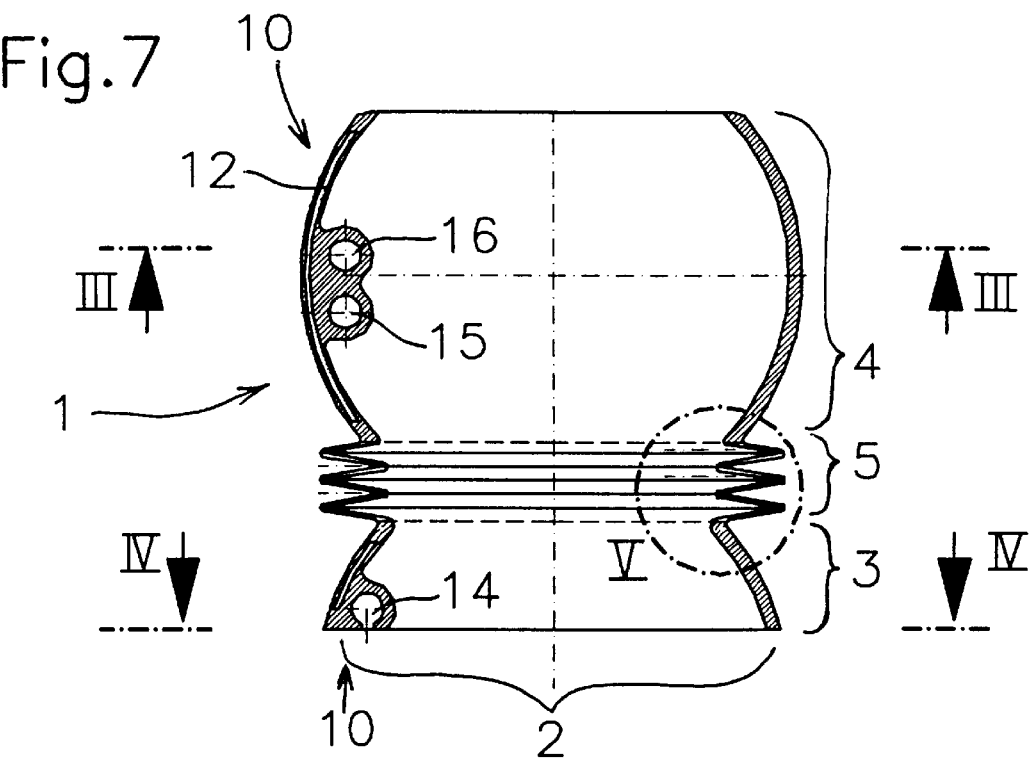
FIG. 7 is a sectional front view of a guide element assembled from two longitudinal halves with each having only one joining region and with additionally reinforcing connecting means.

FIG. 7 is a sectional front view of a guide element 1, which is assembled from two longitudinal halves, each having only one joining region 10. Adjacent the joining region 10 of the two longitudinal halves, in which a tongue 12 is formed, the guide element 1 comprises three connecting means 14, 15, 16, which reinforce the structure of the guide element 1. One of the connecting means 14 is arranged within the first guide section 3, and two additional connecting means 15, 16 are arranged within the second guide section 4.

FIGS. 8 and 9 are a sectional bottom and a top view respectively of the longitudinal halves 6 and 7 of FIG. 7 along a line III—III and a line IV—IV. The two longitudinal halves 6 and 7 comprise each a joining region 10, which includes a tongue 12 and a groove 13, respectively for joining the longitudinal halves 6, 7. Alternatively and/or cumulatively thereto, adjacent the joining region 10, the connecting means 14 and 16 on the first longitudinal half 6 are designed and constructed in the shape of pins 14a, 16a, and engage each in a corresponding receptacle 14b, 16b formed in the second longitudinal half 7. A connecting means 15, which is not visible because of the position of the section III—III, is designed and constructed either in the same manner as the connecting means 14 and 16, or exactly opposite for increasing the reinforcing effect, namely in the shape of a pin 15a on the second longitudinal half 7, which engages a corresponding receptacle 15b formed in the first longitudinal half 6, as is indicated in phantom lines in FIG. 8.

Figure 10:
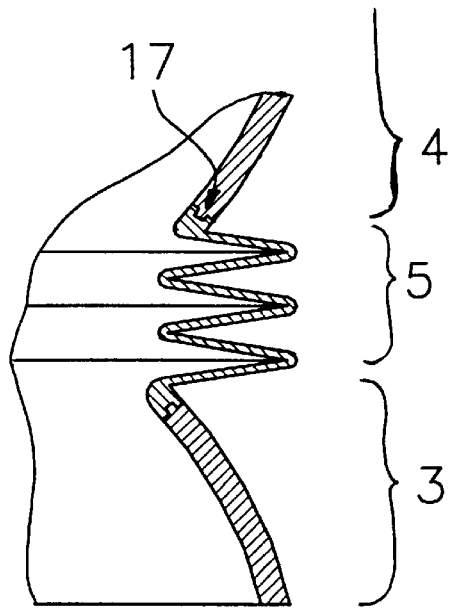
FIG. 10 is an enlarged view of a cutout V of FIG. 7 showing a connection of the guide sections to the joint section.

FIG. 10 is an enlarged view of a cutout V showing a connection of the guide sections 3 and 4 with the joint section 5 according to FIG. 7. Both the guide sections 3 and 4 and the joint section 5 of the longitudinal halves 6 and 7 may be formed of a plastic. Preferably, however, the joint section 5 is composed of a different material from the plastic of guide sections 3 and 4, in particular a softer material, so that the joint section 5 is at least in part elastic. If so, it is preferred to mold the guide sections 3 and 4 to the joint section 5 by the bicomponent injection molding method. FIG. 10 illustrates in particular that the preferably accordion-type joint section 5 includes cavities 17, in particular grooves or bores for receiving therein the guide sections 3 and 4 in material-to-material engagement.

Figure 11:
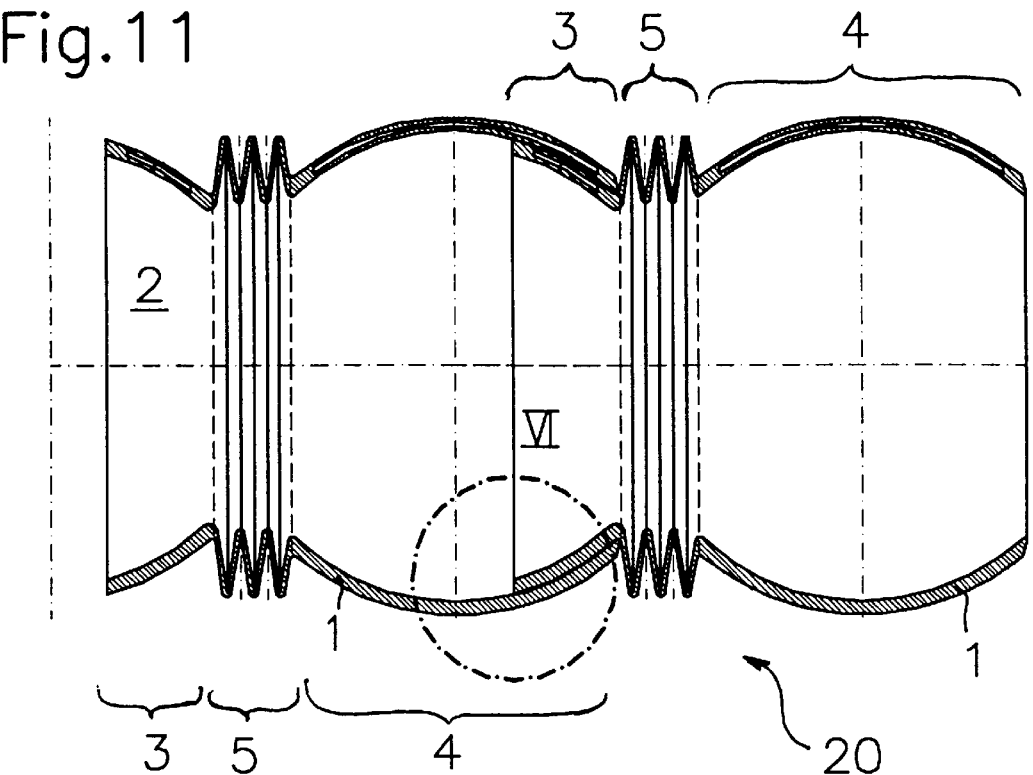
FIG. 11 is a sectional front view of a segment of a guide chain formed from the guide elements according to one of FIGS. 1–9.

FIG. 11 is a sectional front view of a segment of guide chain 20 formed from guide elements 1 of one of FIGS. 1–9. In this chain, the first 3 and second 4 guide sections of adjacent guide elements 1 are joined to each other in formfitting and/or force-locking or frictional engagement. In particular, the first guide section 3 engages the second guide section 4 of adjacent guide elements 1. As can further be noted, the guide sections 3, 4 are designed and constructed preferably corresponding, in particular in the shape of spherical segments, as well as for turning or twisting relative to one another.

Figure 12:
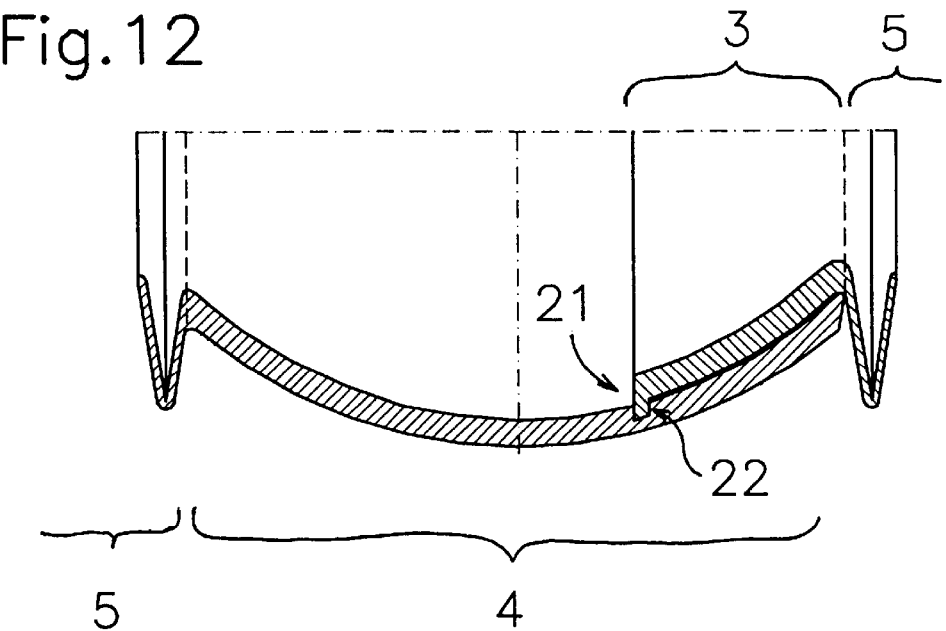
FIG. 12 is an enlarged view of a cutout VI of FIG. 11 showing the segment of a guide chain with restraining means for limiting an angle of traverse or twist.

FIG. 12 is an enlarged view of a cutout VI showing the segment of a guide chain shown in FIG. 11. Restraining means 21, 22 for defining the angle of traverse or twist are preferably designed and constructed according to the tongue and groove principle, preferably in such a manner that of two adjacent guide sections 3 and 4, the first section 3 comprises a restraining element 21 in the shape of a pin, which engages a corresponding groove 22 provided in the adjacent second guide section 4.

Figure 13:
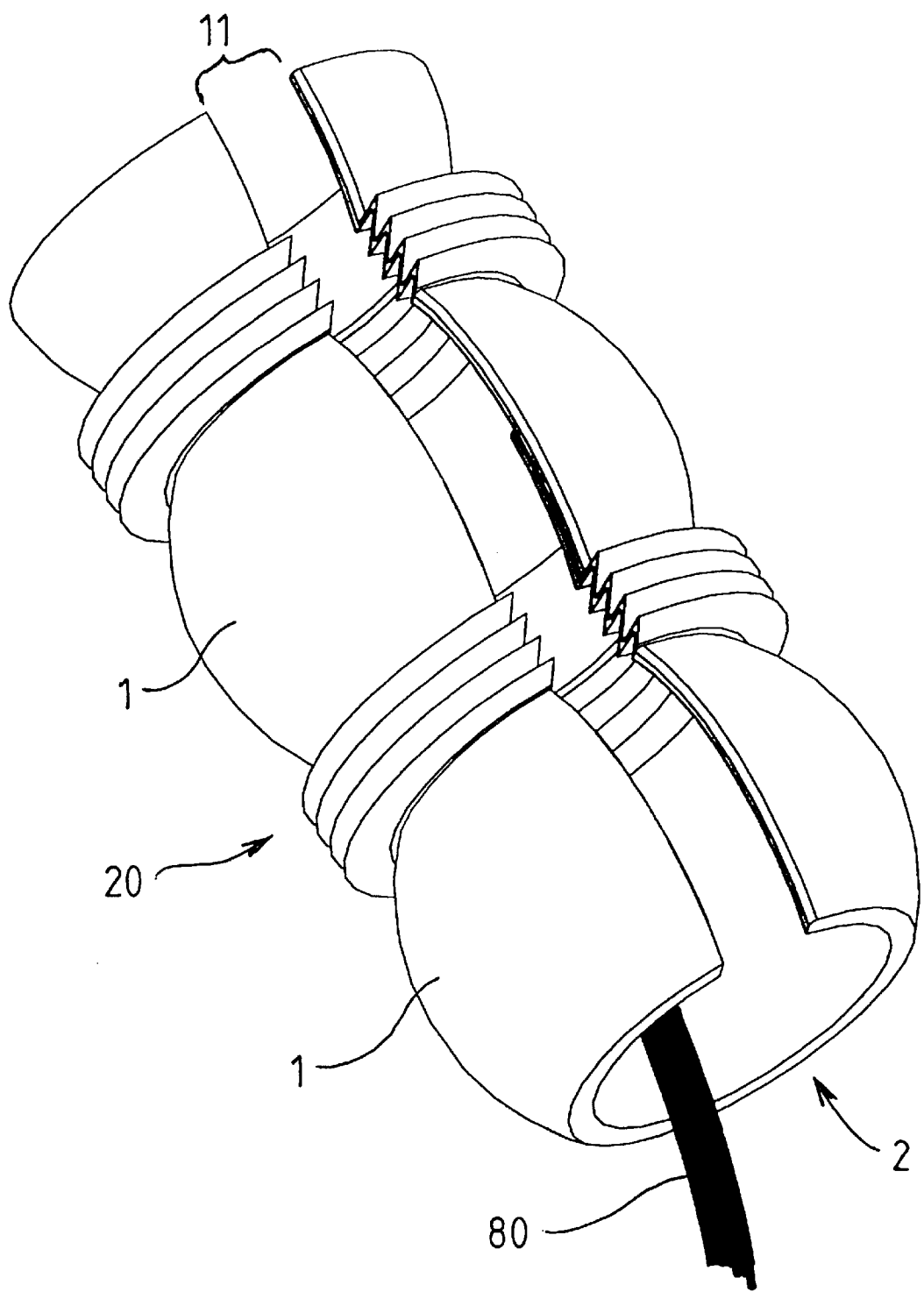
FIG. 13 is a perspective view of a segment of a guide chain formed from guide elements according to FIG. 11.

FIG. 13 is a perspective view of the segment of the guide chain 20 formed from guide elements 1 according to FIG. 11. Clearly visible is the continuous slot 11 that extends in the longitudinal direction of guide elements 1. This slot permits inserting at least one cable 80 even subsequently, i.e., after the assembly of such a guide chain 20. If one wants to avoid that an inserted cable 80 drops out, same can easily be accomplished, in that one closes the guide chain 20 by simply twisting its guide elements 1.

Figure 14:
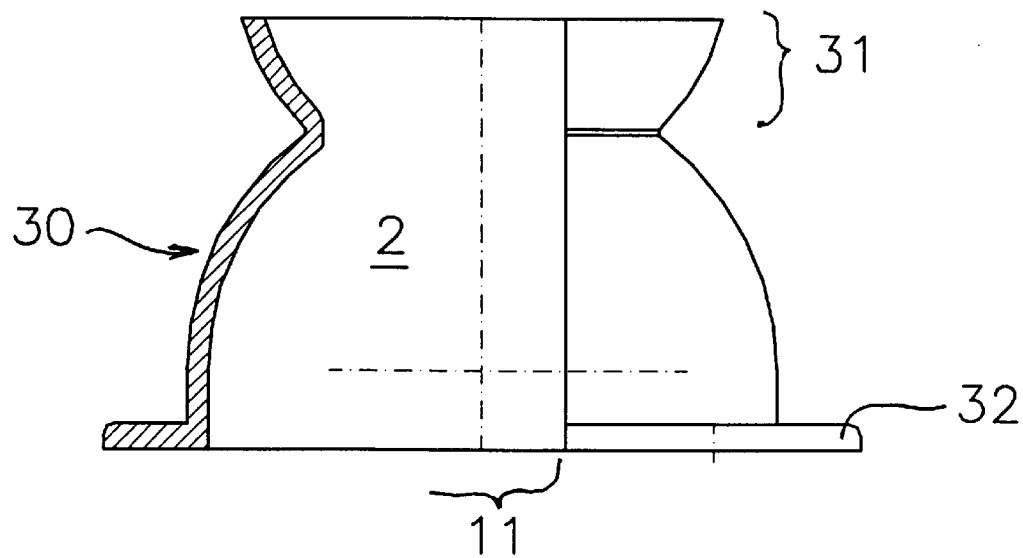
FIG. 14 is a partially sectioned front view of a first embodiment of a terminal mounting element.

FIG. 14 is a partially sectioned front view of a first embodiment of a terminal mounting element 30. In like manner as the previously described guide elements, the terminal mounting element 30 defines a central guide area 2, and it is used to attach a guide chain formed from guide elements to a junction point, in particular to a floor or wall. The terminal mounting element 30 comprises a coupling section 31 in the shape of a spherical segment, which can be connected to a corresponding second guide section of a guide member in formfitting and/or force locking or frictional engagement. In this instance, the coupling section 31 is surrounded by an adjacent second guide section of a guide element. For this reason, it is preferred to design and construct the coupling section 31 of the terminal mounting element 30 essentially in the same way as a first guide section of a guide element. Opposite to the coupling section 31, the terminal mounting element 30 comprises a substantially radially outward directed collar 32.

Figure 15:
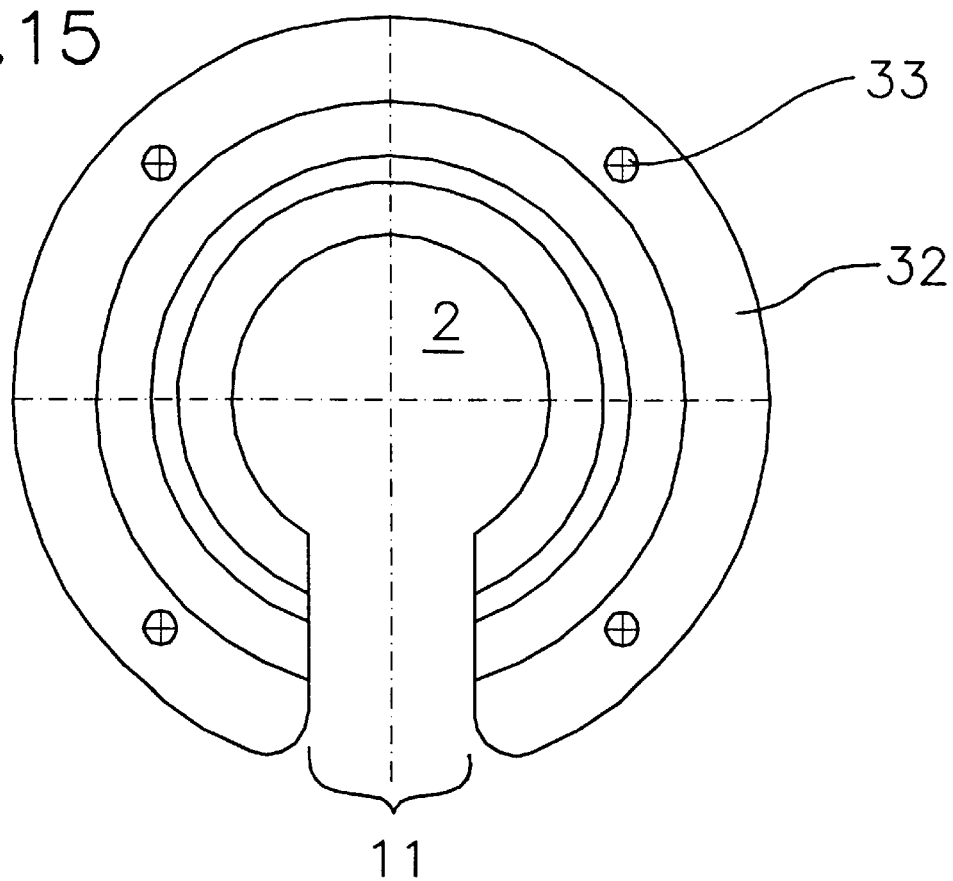
FIG. 15 is a bottom view of the terminal mounting element of FIG. 14.

FIG. 15 is a bottom view of the terminal mounting element 30 of FIG. 14. As shown, the collar 32 of the terminal mounting element 30 is made circular. The circumference of the collar 32 includes four openings 33, which are preferably equally spaced from one another, in particular at an angle of 90°. The coupling section 31 comprises at least one slot 11 extending in the longitudinal direction of the terminal mounting element 30. In addition to facilitating a connection of the terminal mounting element 30 to a guide section of a guide element, the slot 11 is used to insert the at least one cable at a later time.

Figure 16:
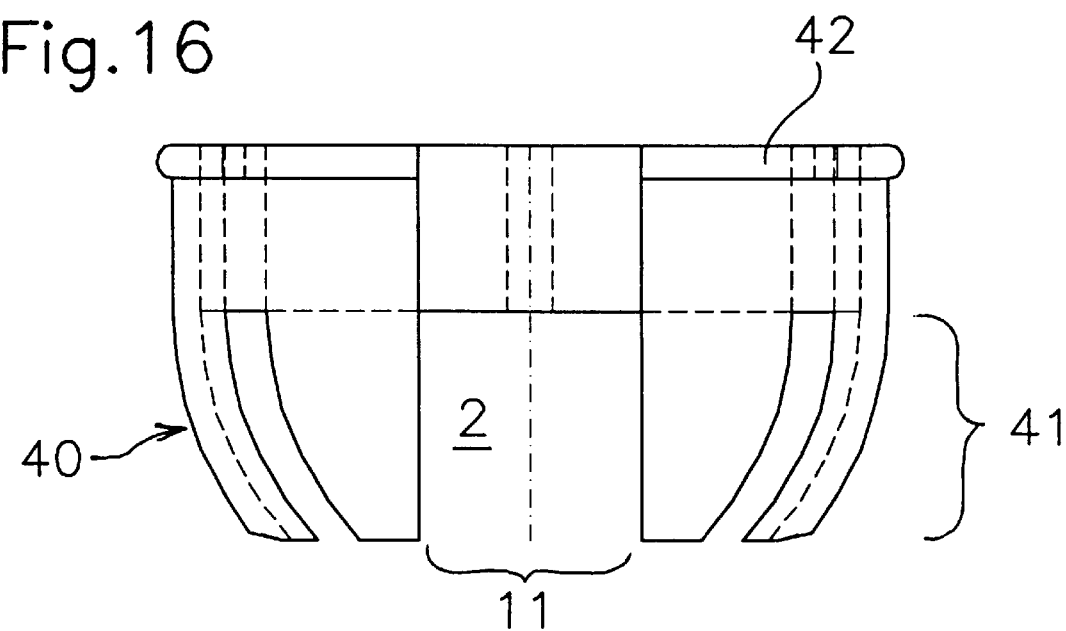
FIG. 16 is a sectional front view of a second embodiment of a terminal mounting element.

FIG. 16 is a front view of a second embodiment of a terminal mounting element 40. The terminal mounting element 40 likewise defines a central guide area 2, and it is used to attach to a junction point a guide chain that is formed from guide elements. The terminal mounting element 40 comprises a coupling section 41 having the shape of a spherical segment, which can be joined with a corresponding first guide section of a guide element in formfitting and/or force-locking or frictional engagement. Opposite to the coupling section 41, the terminal mounting element 40 comprises a substantially radially outward directed collar 42.

Figure 17:
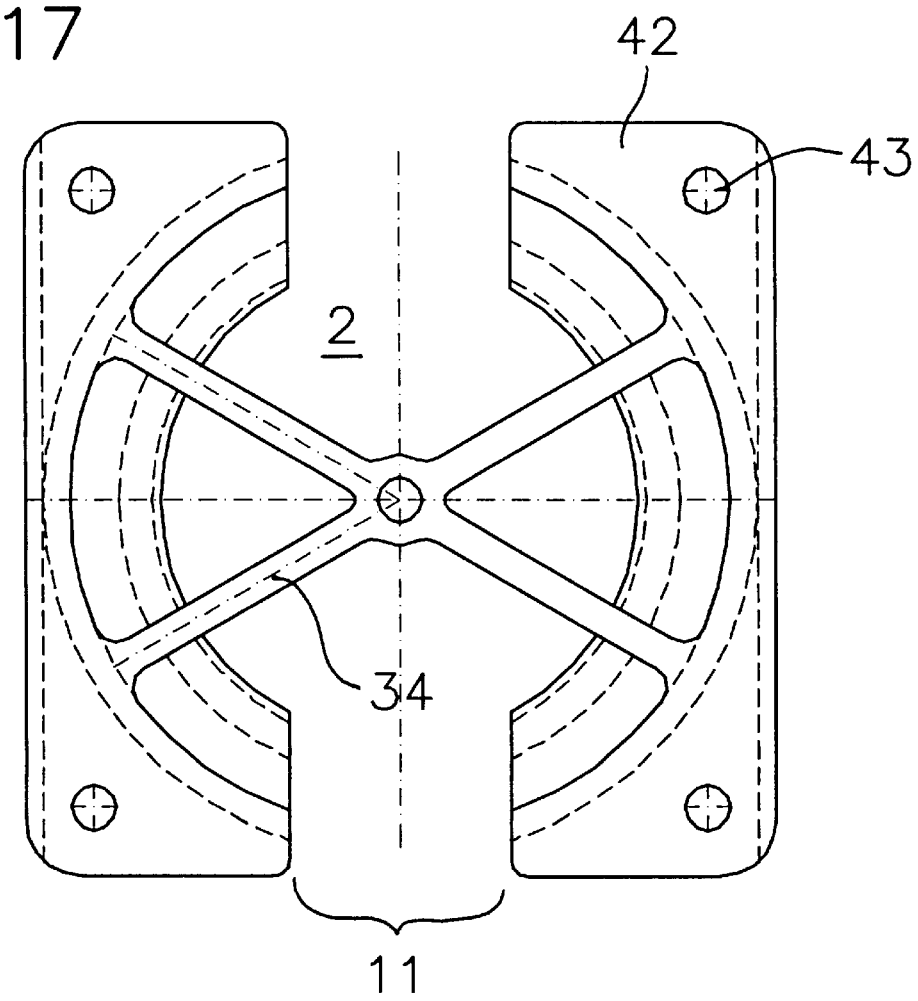
FIG. 17 is a top view of the terminal mounting element of FIG. 16.

FIG. 17 is a top view of the terminal mounting element 40 according to FIG. 16. In this embodiment, the collar 42 of the terminal mounting element 40 is made rectangular. The circumference of the collar 42 includes four openings 43, which are preferably equally spaced from one another, in particular at an angle of 90°. The coupling section 41 comprises two intersecting reinforcement structures 34, as well as two slots 11 extending in the longitudinal direction of the terminal mounting element 40, which are used to insert the at least one cable at a later time.

Figure 18:
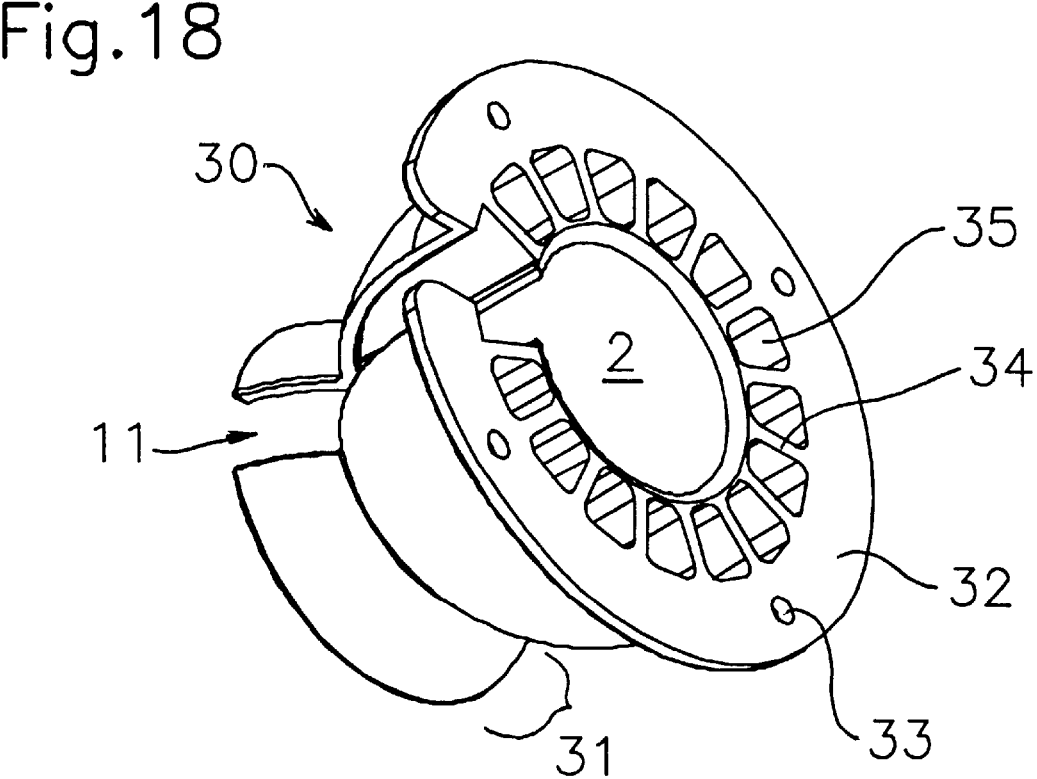
FIG. 18 is a perspective view of the terminal mounting element of FIGS. 14 and 15.

FIG. 18 is a perspective view of the terminal mounting element 30 of FIGS. 14 and 15. The guide area 2 is surrounded by reinforcing structures 34, which form a plurality of interspaces or cavities 35 in the terminal mounting element 30. These structures reinforce in an advantageous manner the terminal mounting element 30, which is made of plastic, and intended in particular for a floor-mounted junction point. For a lasting positioning of the terminal mounting element 30 over a floor-mounted junction point only by means of gravity, it is possible to arrange in the interspaces or cavities 35 advantageously materials of a high specific density, for example, lead, lead glance, gray iron, or the like. Normally, such a weighted terminal mounting element 30 need not be additionally bolted via the openings 33, so that the surrounding of the junction point remains free of damage.

Figure 19:
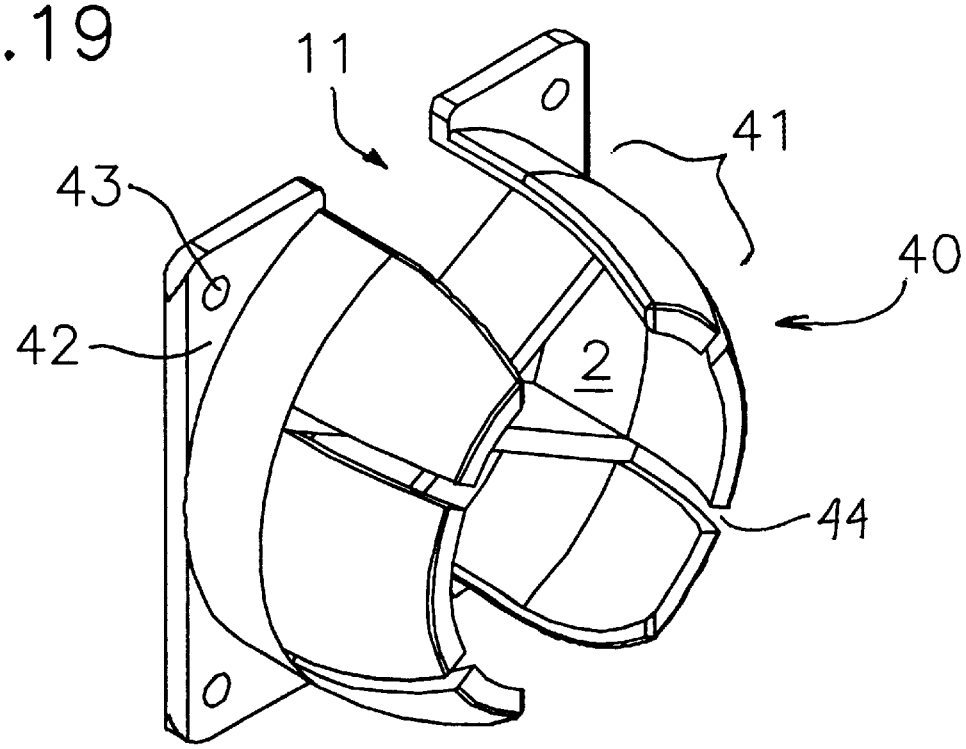
FIG. 19 is a perspective view of the terminal mounting element of FIGS. 16 and 17.

FIG. 19 is a perspective view of the terminal mounting element 40 of FIGS. 16 and 17. Besides slots 11, the coupling section 41 comprises additional slots 44 for inserting the at least one cable. These slots facilitate joining the coupling section 41 to a first guide section in an advantageous manner. In particular during the assembly with a first guide section, it is possible to spread the coupling section 41 slightly and bring it subsequently into an external surrounding contact surrounding with the adjacent first guide section.

Figure 20:
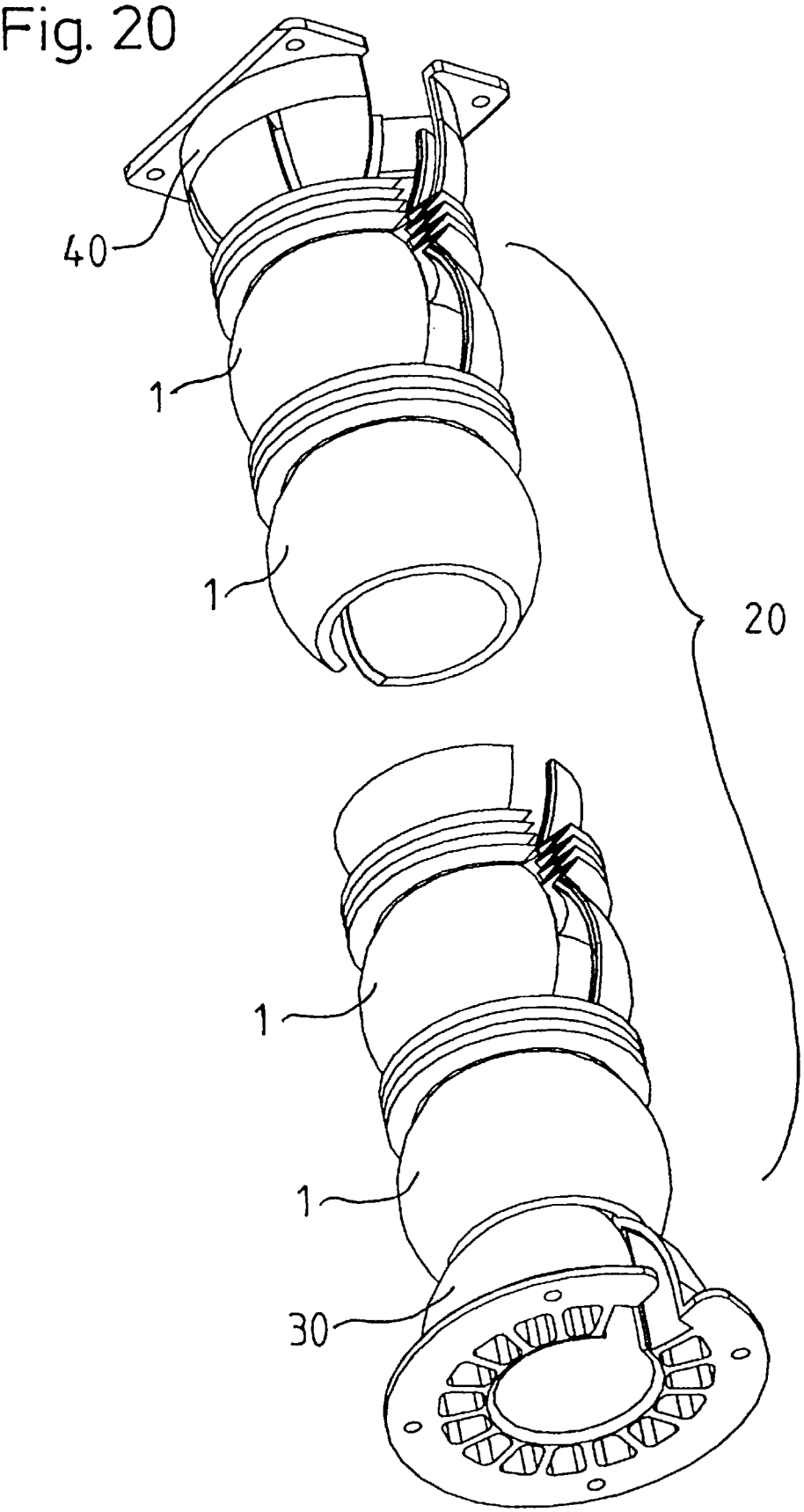
FIG. 20 illustrates a line guide chain formed from guide elements with one terminal mounting element of FIGS. 18 and 19 respectively arranged at each end.

FIG. 20 illustrates a guide chain 20 constructed from guide elements 1 with a terminal mounting element 30, 40 arranged at each end. In like manner as the guide elements among themselves, the guide sections 3, 4 are also joined for twisting or turning relative to the coupling sections 31, 41.

Figure 21:
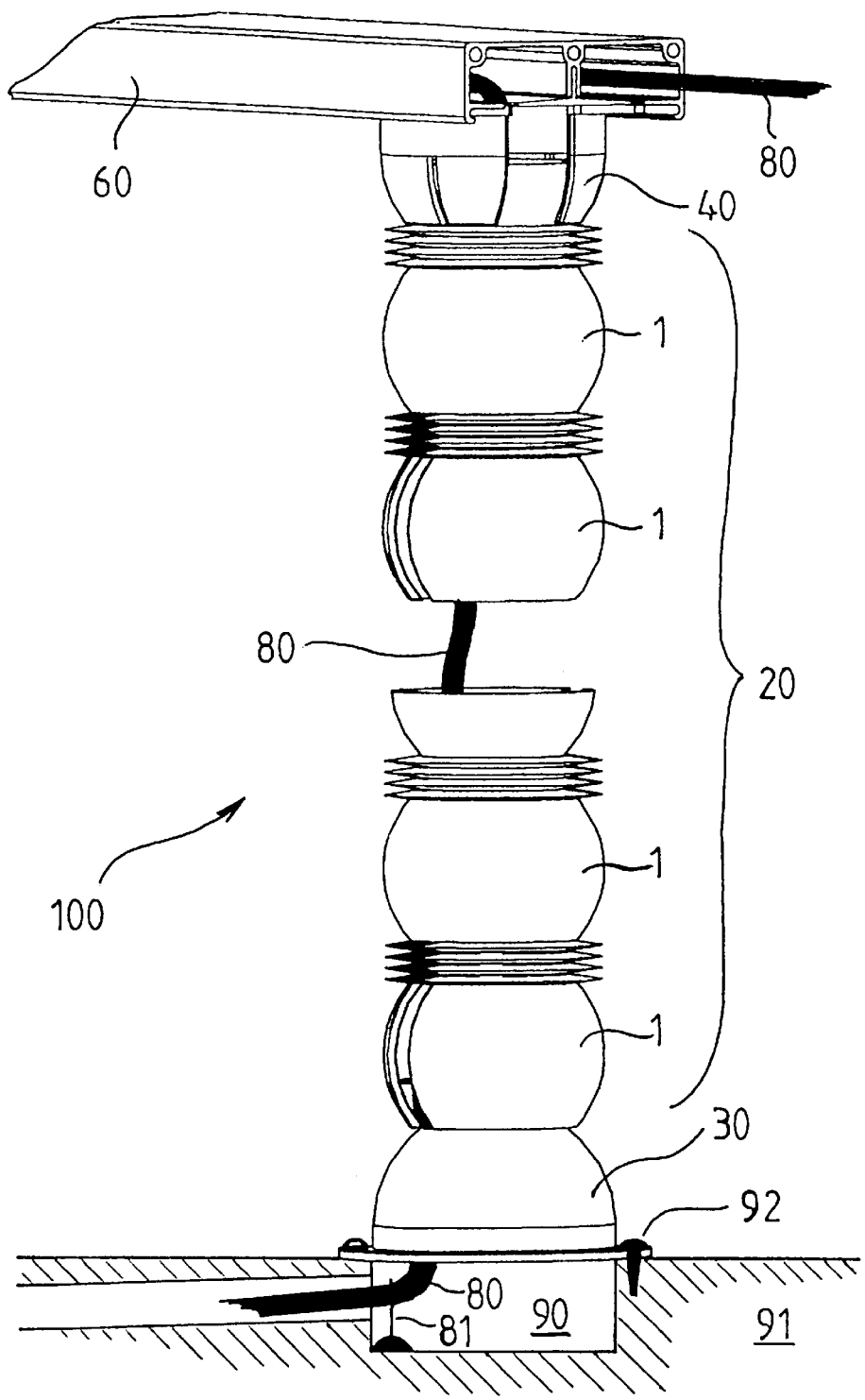
FIG. 21 illustrates a modular system for constructing a line guide chain arrangement.

FIG. 21 illustrates a modular system 100 for constructing a line guide chain arrangement for running at least one cable 80. The modular system comprises guide chains 20, as shown in FIGS. 11–13, which are formed from guide elements 1, as shown in FIGS. 1–10, terminal mounting elements 30, 40, as shown in FIGS. 14–19, and hollow guide sections 60 with a preferably rectangular cross section. Alternatively and/or cumulatively, the modular system may also comprise hollow guide sections with a circular cross section.

The guide chain 20, as previously illustrated in FIG. 20 and constructed from guide elements 1, is attached with a terminal mounting element 30, as shown in FIGS. 14, 15, and 18, to a junction point 90 arranged in a floor 91 by means of screws 92. The junction point 90 includes means 81 for relieving a pull of the line 80. The opposite end of the guide chain 20 is attached with a terminal mounting element 40 of FIGS. 16, 17, and 19 to a junction point formed in the rectangular hollow guide section 60.

Figure 22:
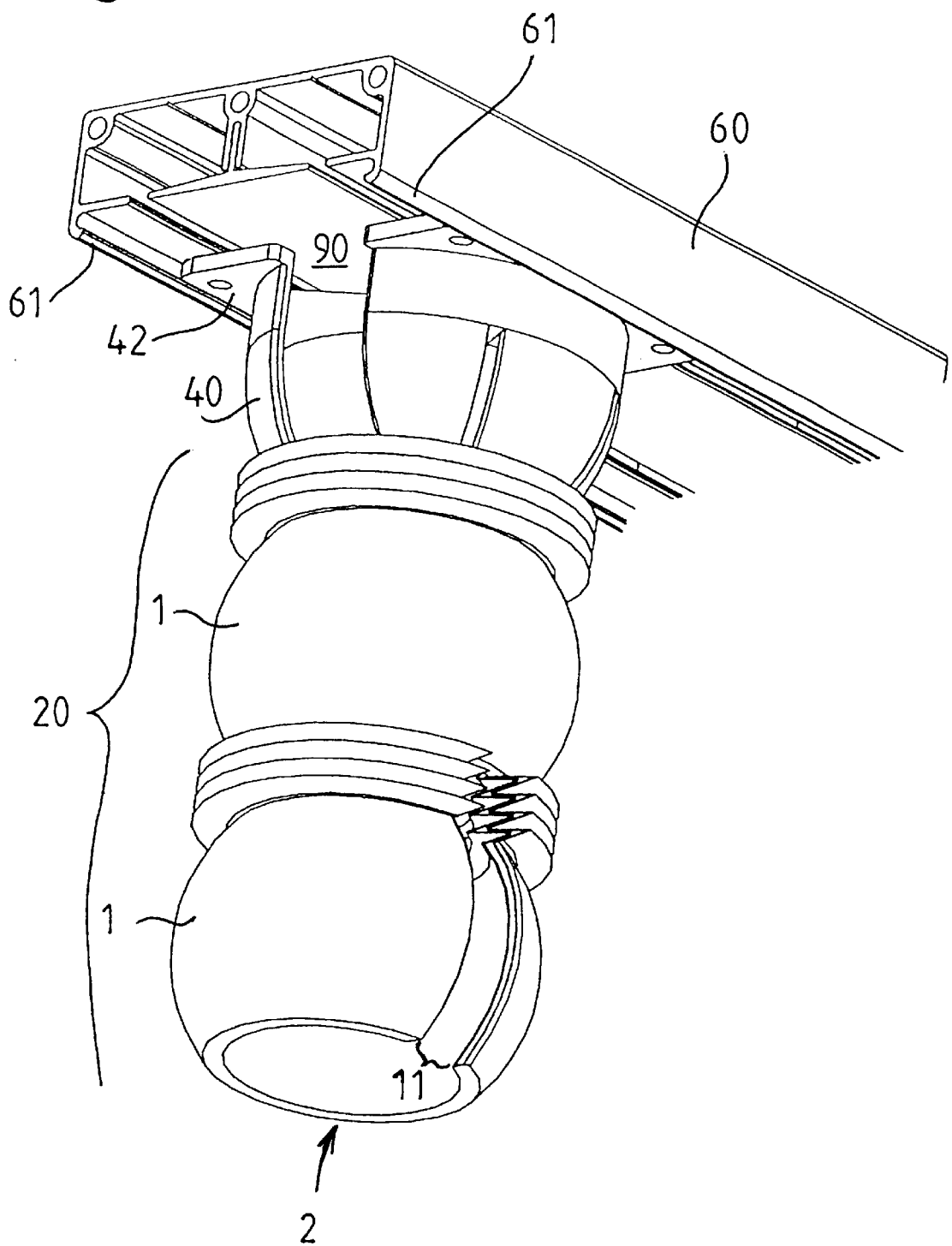
FIG. 22 is an enlarged perspective view of a junction point of a guide chain to a rectangular hollow guide section by means of a terminal mounting element according to FIG. 19.

FIG. 22 is an enlarged, perspective view of a junction point 90 of the guide chain 20 to a rectangular, hollow guide section 60 by means of a terminal mounting element 40. The rectangular hollow guide section 60 comprises two depending outer side walls which extend parallel to each other, and which include two opposing, inwardly extending clamping lips 61 for attaching a terminal mounting element 40 with a rectangular collar 42. By means of the clamping lips 61, which are made continuous, it is possible to position the terminal mounting member 40 in an advantageous manner by simply sliding it along the length of the hollow guide section 60 to any desired position.

Figure 23:
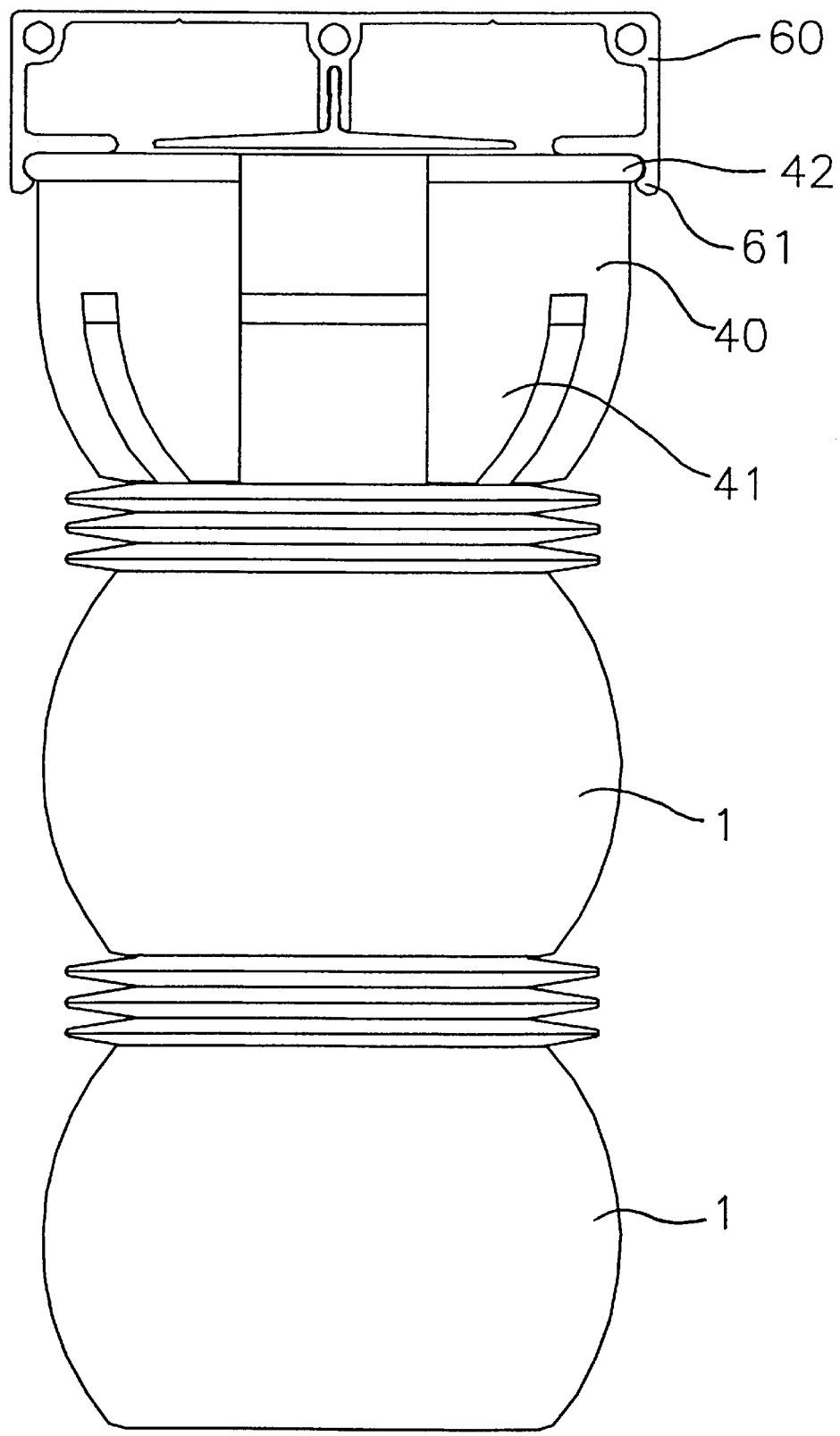
FIG. 23 is a front view of the junction point of FIG. 22.

FIG. 23 is a front view of the junction point of FIG. 22. As can be noted, the parallel extending clamping lips 61 are spaced from each other such that the rectangular collar 42 of the terminal mounting element 40 can be slid thereinto from the front end of the hollow guide section 60. Alternatively and/or cumulatively, the clamping lips 61 may be flexible to the extent that it is also possible to clamp the collar 42 of the terminal mounting element 40 into the section 60.

Figure 24:
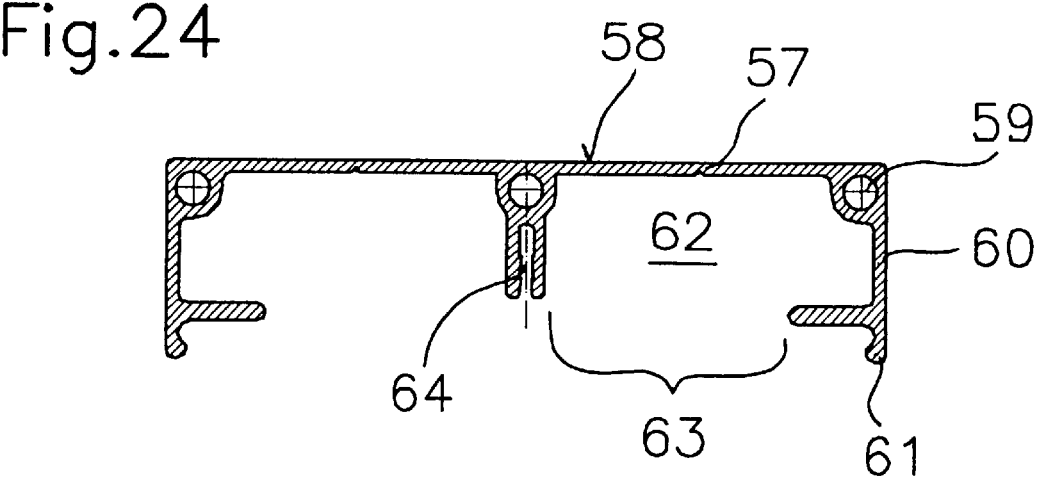
FIG. 24 is a sectional front view of the rectangular hollow guide section according to FIGS. 22 and 23.

FIG. 24 is a front view of the rectangular hollow guide section 60. The hollow guide section 60 comprises a back wall 58 and two depending outer side walls, and it defines at least two guide areas 62 extending in the direction of the hollow guide section 60, so that it is also possible to run a plurality of cables separated from one another. The two guide areas 62 are formed in particular by a center ridge, which is preferably designed and constructed to include a receiving groove 64. Each guide area 62 comprises a continuous slot 63 extending in the longitudinal direction of the hollow guide section 60. Preferably, the slots 63 can be closed by a common cover. In the back wall 58 opposite to the slots 63, the hollow guide section 60 includes openings 59 that extend preferably over its entire length. On the one hand, these openings reinforce the structure of the hollow profile 60, and on the other hand, they can also be used for mounting the hollow guide section 60 at the front end. As an alternative to a front-end mount of the hollow guide section 60, in which case it should be noted that the region of the clamping lips 61 remain free for receiving a terminal mounting element, the hollow guide section 60 may be mounted with the rear side of the back wall 58 opposite to the slots 63, for example to a rear surface of a piece of furniture. To facilitate such a mount, the inside of the back wall 58 may include a marking 57, which is, for example, a longitudinal crimp.

Figure 25:
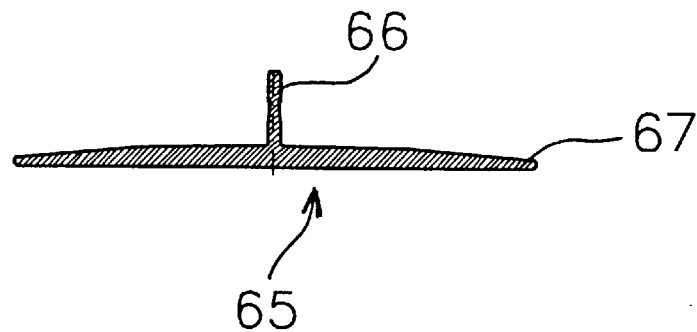
FIG. 25 is a sectional front view of a preferred cover for a hollow guide section according to FIG. 24.

FIG. 25 shows a preferred cover 65 for a hollow guide section of FIG. 24. The cover comprises a tongue 66, which cooperates with the groove 64 formed in the hollow guide section such that the slots 63 are essentially covered. To be able to insert cables even into the covered hollow guide section, the cover may have an elastic edge 67, which can be raised for inserting the cable.

Figure 26:
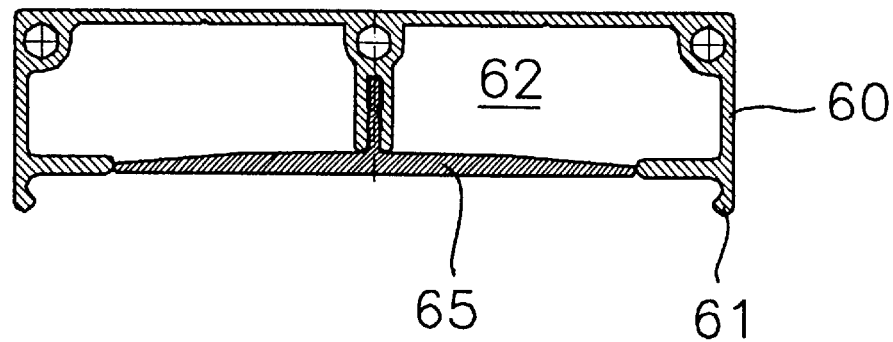
FIG. 26 illustrates the hollow guide section of FIG. 24 with the cover of FIG. 25.

FIG. 26 illustrates a hollow guide section 60 of FIG. 24 with a cover 65 of FIG. 25. In an advantageous manner, such a hollow guide section with a single cover is simple to make. Suitable materials are both plastic and extrudable metals. Moreover, cables can easily be inserted into the defined guide areas without tools.

Figure 27:
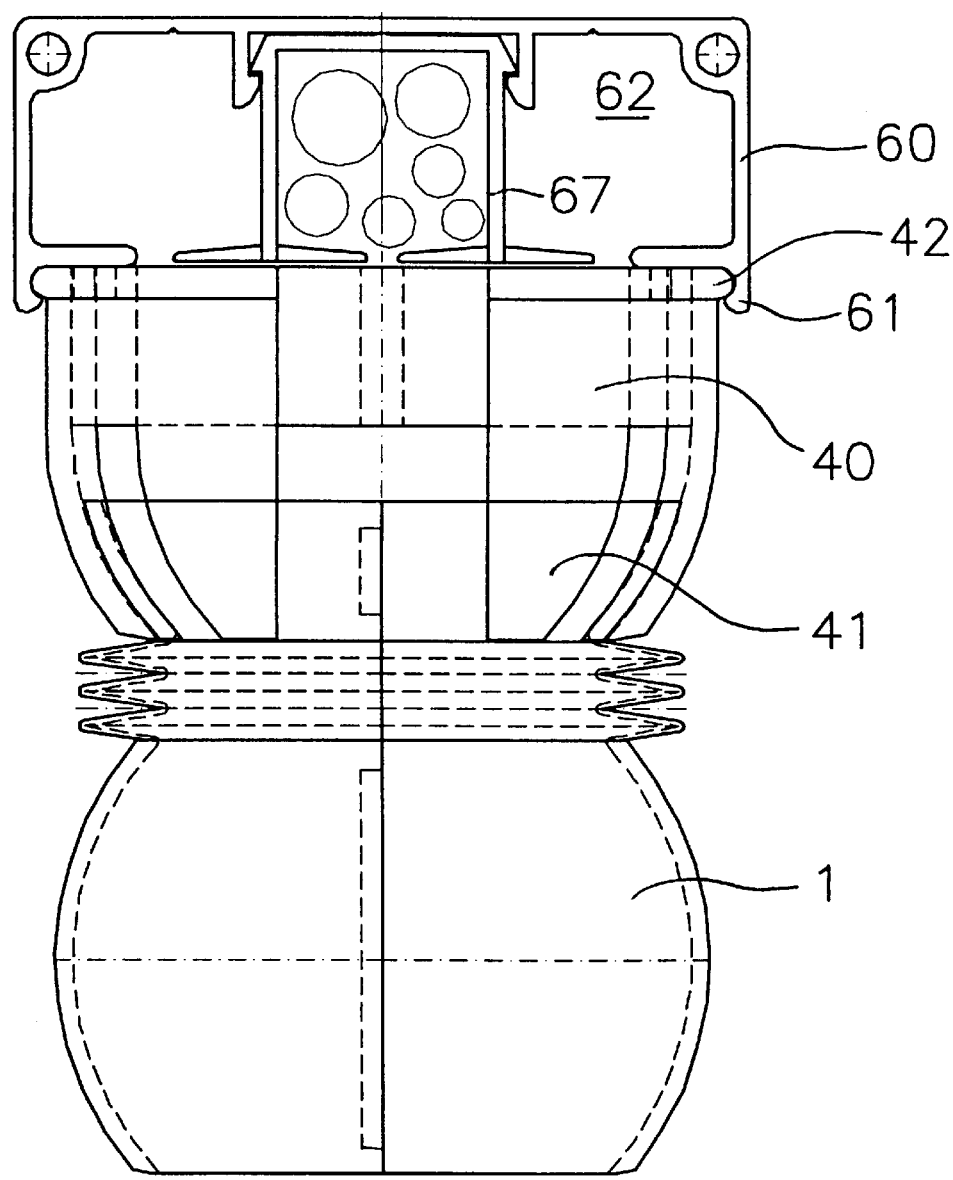
FIG. 27 is a front view of the junction point of FIG. 22 with an alternative hollow guide section.

FIG. 27 is a front view of the junction point of FIG. 22 with an alternative hollow guide profile 60. The parallel extending clamping lips 61 are again designed and constructed in the same manner, as has already been described with reference to FIG. 23. Instead of two guide areas 62, the hollow guide section 60 now comprises three guide areas 62, which are essentially formed by a dividing element 67.

Figure 28:
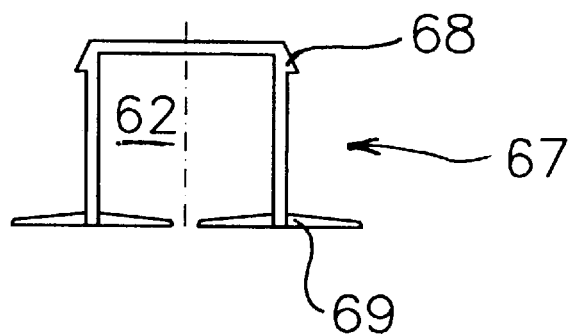
FIG. 28 is a front view of a dividing element for insertion into a hollow guide section.

FIG. 28 shows at least one dividing element 67 that can be inserted into a hollow guide element 60. As an alternative to the guide areas 62 formed in the hollow guide section 60 of FIG. 24, this dividing element is used to form several guide areas 62. According to the embodiment of FIG. 28, the dividing element 67 is made substantially in U-shape. Formed in the corners of the U-shape are detents 68 for a connection to the hollow guide section. At the ends of its arms, the dividing element 67 mounts covers 69, which prevent the cables from dropping out, and which are again made preferably elastic, so as to be able to insert a cable at a later time.

Figure 29:
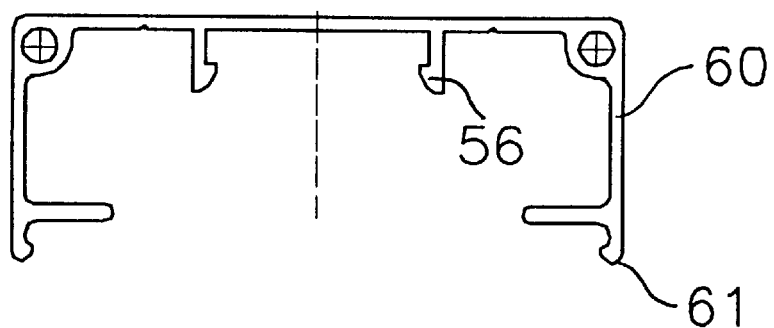
FIG. 29 is a front view of a hollow guide section for use with the dividing element of FIG. 28.

FIG. 29 shows a hollow guide section 60 suitable for use with a dividing element. The hollow guide section 60 accommodates locking elements 56 that correspond with the detents formed on the dividing element.

Figure 30:
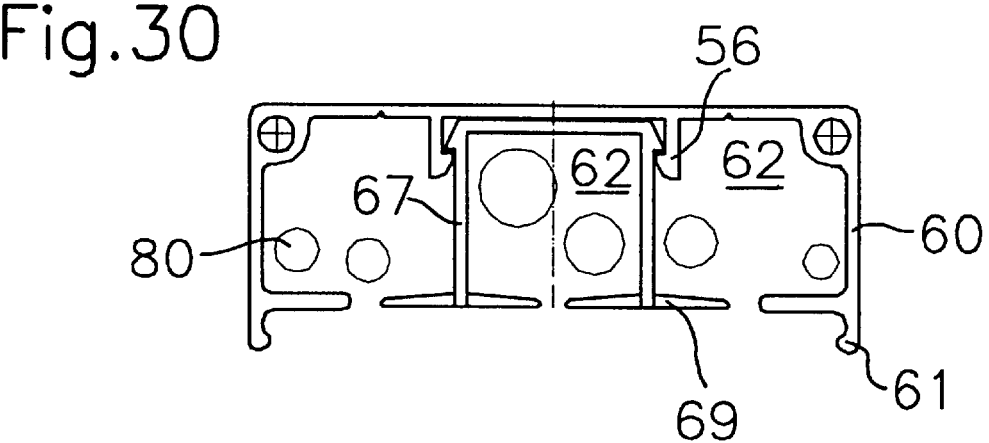
FIG. 30 illustrates the hollow guide section of FIG. 29 assembled to dividing element of FIG. 28.

FIG. 30 illustrates a hollow guide section 60 of FIG. 29 with a dividing element 67 of FIG. 28, whereby three guide areas 62 are formed for running cables 80 separated from one another. A separate dividing element 67 facilitates in particular the manufacture of the hollow guide section 60, which can again be made from a plastic or an extrudable metal. In addition, the separate manufacture of section 60 and dividing elements 67 has the advantage that while using the same hollow guide section 60, it is possible to form thus individualized guide sections 62 that are adaptable to changing tasks by inserting differently shaped dividing elements.

As previously described, the hollow guide section may be joined, as desired by the user, for example, to office furniture, via a screw connection to the frame. Alternatively, the hollow guide section may also be joined via a separate fitting, which preferably permits turning the hollow guide section.

In the latter instance, wherein the hollow guide section is attached for turning to the office furniture, the guide section need not even be removed for inserting a dividing element or a cable. Furthermore, such a mount has the advantage that by turning the section, the user can position the cables, as desired.

To close the hollow guide section with the cover, it has already been proposed above that of a cover and hollow guide section, the one comprises detents, and the other grooves cooperating with the detents. Alternatively or cumulatively, it is possible that of a cover and hollow guide section, the one also comprises at least one tongue and the other at least one groove cooperating with the tongue.

Figure 31:
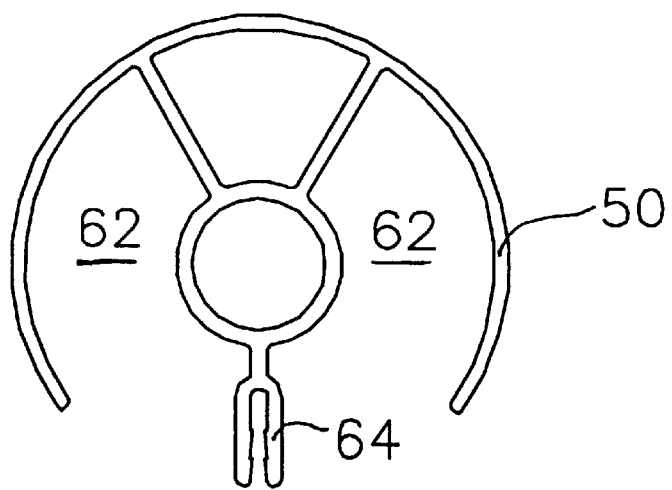
FIG. 31 is a front view of an alternative hollow guide section with a circular cross section.

FIG. 31 illustrates an alternative hollow guide section 50 with a substantially circular cross section, which contains two guide areas 62. A groove 64 serves as a connection to a cover.

Figure 32:
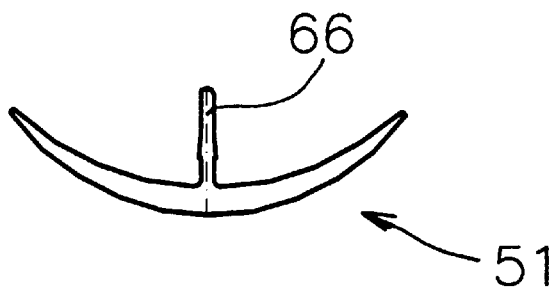
FIG. 32 is a front view of a preferred cover for a hollow guide section of FIG. 31.

FIG. 32 illustrates a preferred cover 51 for a hollow guide section 50 according to FIG. 31. The cover comprises a tongue 66, which cooperates with the groove of the circular hollow section for purposes of closing.

Figure 33:
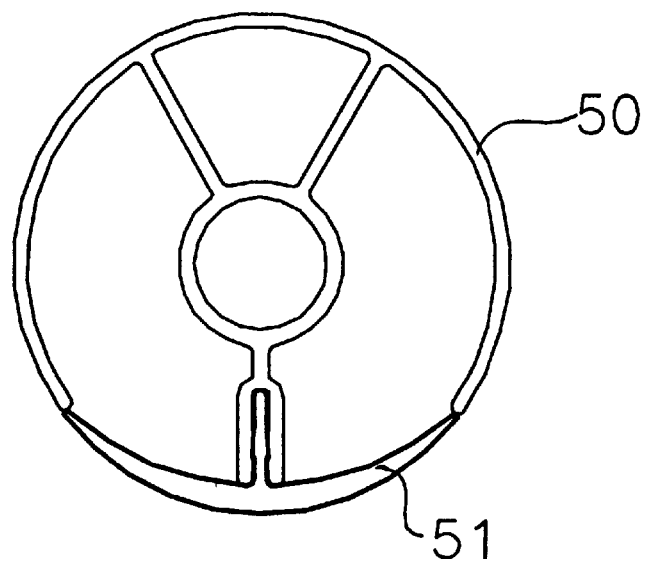
FIG. 33 illustrates the hollow guide section of FIG. 31 assembled to the cover of FIG. 32.

FIG. 33 illustrates the hollow guide section 50 of FIG. 31 assembled with a cover 51 of FIG. 32. As regards the material properties as well as for further advantageous embodiments, reference may be made to the description of the rectangular hollow guide sections and their covers. In particular, it should be mentioned that the circular hollow guide section may also comprise corresponding, separate dividing elements for defining further guide areas.

Figure 34:
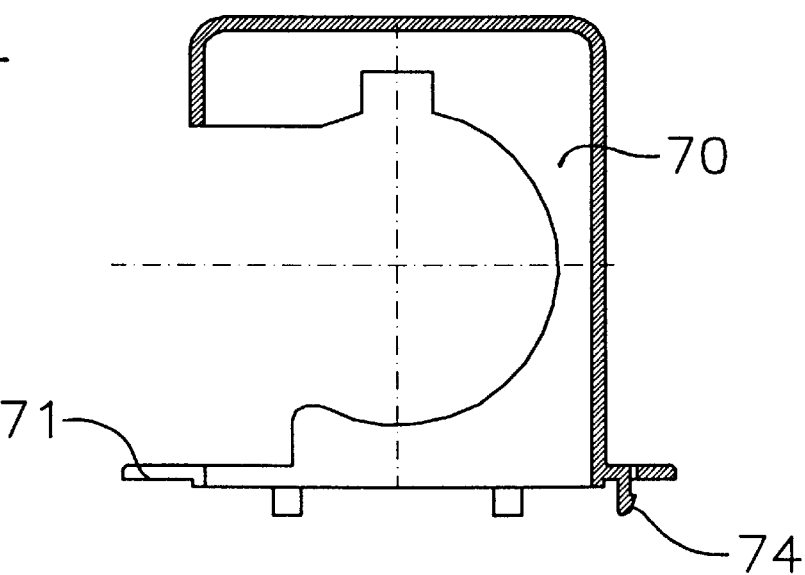
FIG. 34 is a sectioned side view of an adapter for attaching a terminal mounting element to a hollow guide section of FIG. 31.

FIG. 34 is a sectional side view of an adapter 70 for attaching a terminal mounting element to a circular hollow guide section. The adapter 70 associated to the modular system comprises at least one substantially flat surface 71 for attaching a terminal mounting element, in particular a terminal mounting element of FIGS. 14 et seq. and 16 et seq. to the circular hollow guide section. Otherwise, it is constructed to correspond largely with the circular cross section of the hollow guide section.

Figure 35:
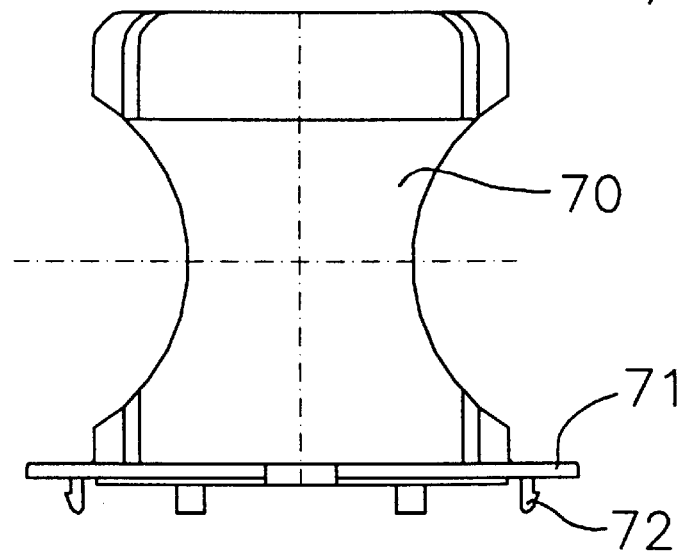
FIG. 35 is a front view of the adapter of FIG. 34.

FIG. 35 is a front view of the adapter of FIG. 34. Detents 72 arranged on the flat surface 71 facilitate the connection to a terminal mounting element, which comprises corresponding locking elements.

Figure 36:
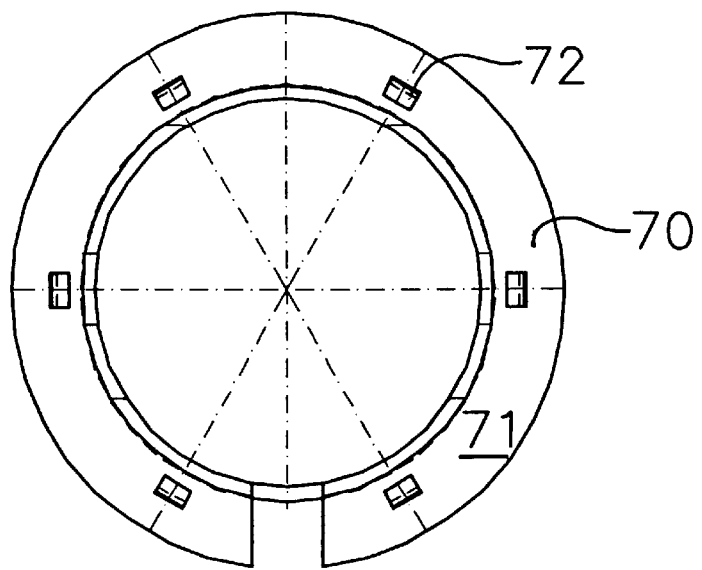
FIG. 36 is a bottom view of the adapter of FIGS. 34 and 35.

FIG. 36 is a bottom view of the adapter of FIGS. 34 and 35. Preferably, the detents 72 are evenly spaced from one another, in particular at an identical phase angle.

Figure 37:
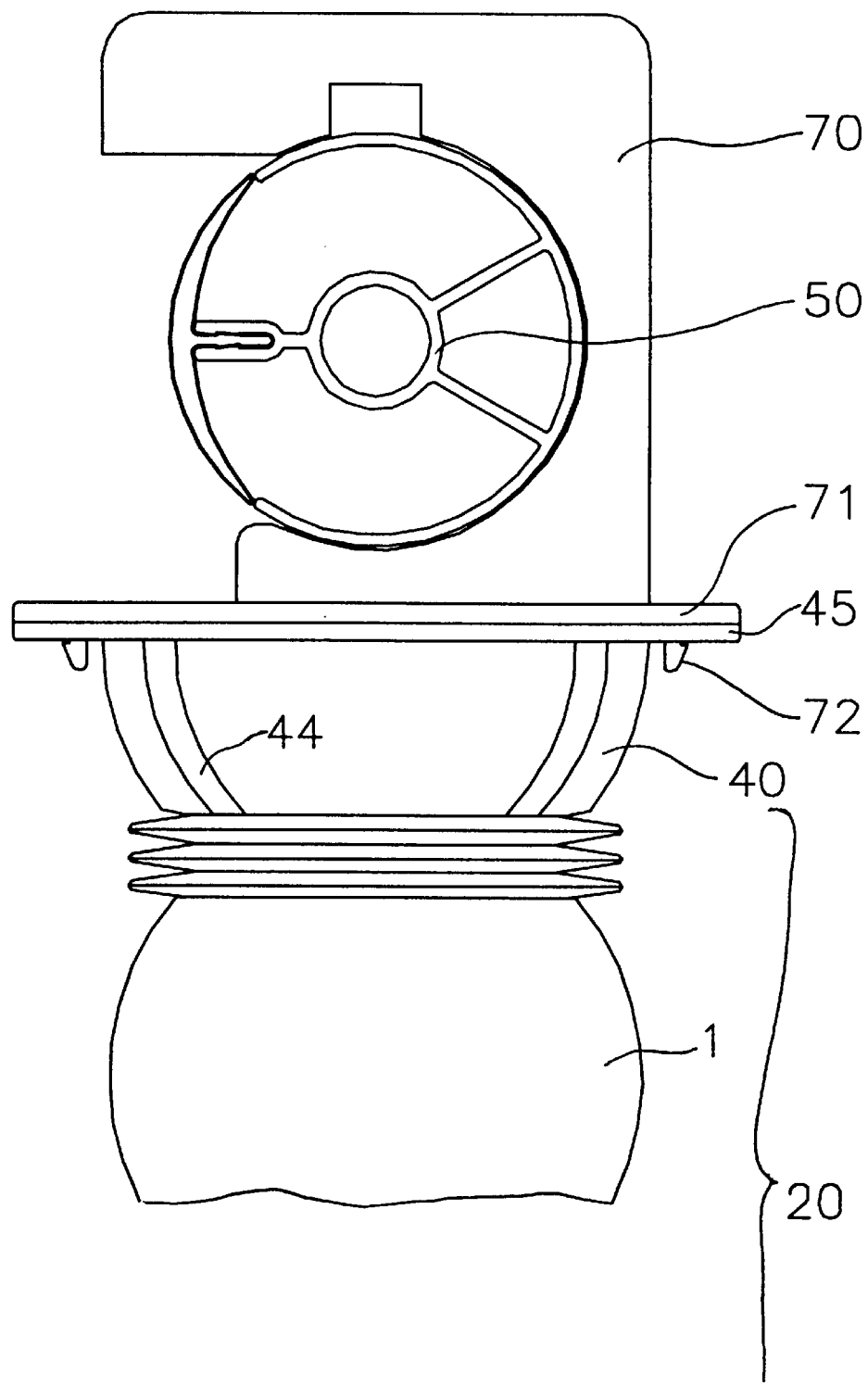
FIG. 37 illustrates a junction point of a guide chain to a hollow guide section with a circular cross section via the adapter of FIG. 34 and the terminal mounting element of FIG. 19.

Finally, FIG. 37 is a side view of a junction point of a guide chain 20 to a circular hollow guide section 50 via the adapter 70 and a terminal mounting element 40 constructed according to FIG. 19. In the place of a rectangular collar, the terminal mounting element 40 comprises a collar 45, in particular a circular collar corresponding with the flat surface 71 and the detents 72 arranged thereon.

What is claimed is:

1. A guide element for an energy conducting guide chain comprising a generally tubular body which defines a longitudinally extending central guide area which is adapted to receive at least one energy conducting line, and which includes first and second longitudinally aligned guide sections which are joined by a flexible intermediate joint section, with the first guide section being configured for coupling engagement with the second guide section of another substantially corresponding guide element to form a chain of longitudinally aligned guide elements, and wherein each of the first and second guide sections has the configuration of a segment of a sphere.

2. The guide element as defined in claim 1 wherein the guide element is composed of two longitudinal halves.

3. The guide element as defined in claim 2 wherein the two longitudinal halves each define a pair of longitudinal edges, with one only of the edges of one half being brought together and joined with one only of the edges of the other half to form one joining region, and with the other edges of the two halves being separated from each other to form a longitudinal slot which permits the at least one energy conducting line to be laterally inserted into the central guide area.

4. The guide element as defined in claim 3 wherein the one joining region comprises a groove along the edge of one half and a tongue along the edge of the other half, with the tongue being received in the groove.

5. The guide element as defined in claim 3 wherein the one joining region comprises connecting means which includes a pin extending from the edge of one of the halves and a mating receptacle in the edge of the other of the halves.

6. The guide element as defined in claim 2 wherein the two longitudinal halves each define a pair of longitudinal edges, with the pair of edges of one half being respectively brought together and joined with the pair of edges of the other half to form joining regions and thereby form a unitary structure which fully encloses the guide area.

7. The guide element as defined in claim 6 wherein each of the joining regions comprises a groove along the edge of one half and a tongue along the edge of the other half, with the tongue being received in the groove.

8. The guide element as defined in claim 6 wherein at least one of the joining regions comprises connecting means which includes a pin extending from the edge of one of the halves and a mating receptacle in the edge of the other of the halves.

9. The guide element as defined in claim 1 wherein the tubular body member is formed from a plastic.

10. The guide element as defined in claim 9 wherein the joint section is formed from a plastic which is softer than the plastic of the first and second guide sections.

11. The guide element as defined in claim 1 wherein the first and second guide sections each have inner and outer surfaces which are each in the form of a segment of a sphere.

12. The guide element as defined in claim 1 wherein the joint section is accordion-shaped.

13. A guide element for an energy conducting guide chain comprising
a generally tubular body which defines a longitudinally extending central guide area which is adapted to receive at least one energy conducting line, and which includes first and second longitudinally aligned guide sections which are joined by an intermediate joint section, with the first guide section being configured for coupling engagement with the second guide section of another substantially corresponding guide element to form a chain of longitudinally aligned guide elements,
wherein each of the first and second guide sections has the configuration of a segment of a sphere, and
wherein the guide element is composed of two longitudinal halves, and the two longitudinal halves each define a pair of longitudinal edges, with one only of the edges of one half being brought together and joined with one only of the edges of the other half to form one joining region, and with the other edges of the two halves being separated from each other to form a longitudinal slot which permits the at least one energy conducting line to be laterally inserted into the central guide area.

14. The guide element as defined in claim 13 wherein the one joining region comprises a groove along the edge of one half and a tongue along the edge of the other half, with the tongue being received in the groove.

15. The guide element as defined in claim 13 wherein the one joining region comprises connecting means which includes a pin extending from the edge of one of the halves and a mating receptacle in the edge of the other of the halves.

16. A guide chain for supporting at least one energy conducting line, comprising
a plurality of guide elements, with each of said guide elements comprising a generally tubular body which defines a longitudinally extending central guide area which is adapted to receive at least one energy conducting line, and which includes first and second longitudinally aligned guide sections which are joined by an intermediate joint section, and with the first and second guide sections each having the configuration of a segment of a sphere,
said guide elements being serially arranged and with adjacent guide elements being coupled together by a coupling wherein the first guide section of one of the adjacent guide elements is coupled to the second guide section of the other of the adjacent guide elements,
wherein the adjacent guide elements are coupled with the spherical first guide section overlying the spherical second guide section of the adjacent guide elements, and so as to permit relative rotation therebetween,
and further comprising a terminal mounting element which defines a guide area and which includes a coupling section joined to the first or the second guide section of an endmost one of the guide elements in the chain, and wherein the guide area of the terminal mounting element communicates with the central guide area of the guide elements, wherein the coupling section of the terminal mounting element has the configuration of the segment of a sphere which is positioned to overlie the spherical first or second guide section of said endmost one of the guide elements, and wherein the coupling section of the terminal mounting element has at least one longitudinal slot, and a radially outwardly extending mounting collar at an end opposite the coupling section.

17. The guide chain as defined in claim 16 wherein the coupling between adjacent guide elements further comprises restraining means for limiting the relative rotation between the adjacent guide elements.

18. A guide chain for supporting at least one energy conducting line, comprising
a plurality of guide elements, with each of said guide elements comprising a generally tubular body which defines a longitudinally extending central guide area which is adapted to receive at least one energy conducting line, and which includes first and second longitudinally aligned guide sections which are joined by an intermediate joint section, and with the first and second guide sections each having the configuration of a segment of a sphere,
said guide elements being serially arranged and with adjacent guide elements being coupled together by a coupling wherein the first guide section of one of the adjacent guide elements is coupled to the second guide section of the other of the adjacent: guide elements,
wherein the adjacent guide elements are coupled with the spherical first guide section overlying the spherical second guide section of the adjacent guide elements, and so as to permit relative rotation therebetween, and
wherein each of said guide elements further comprises a longitudinal slot along the entire longitudinal length thereof which permits the at least one energy conducting line to be laterally inserted into the central guide area.

19. The guide chain as defined in claim 18 further comprising a terminal mounting element which comprises a mounting collar and a coupling section extending from the collar and joined to the first or second guide section of an endmost one of the guide elements in the chain, said terminal mounting element defining an internal guide area which communicates with the central guide area of the guide elements, and said terminal mounting element having a longitudinal slot whereby the at least one energy conducting line may be laterally inserted into the internal guide area of the terminal mounting element.

20. A modular energy conducting guide chain structure for guiding at least one energy conducting line, comprising a guide chain comprising a plurality of guide elements, with each of the guide elements comprising a generally tubular body which defines a longitudinally extending central guide area which is adapted to receive at least one energy conducting line, and which includes first and second longitudinally aligned guide sections which are joined by an intermediate joint section, and with the first and second guide sections each having the configuration of a segment of a sphere, said guide elements being serially arranged and with adjacent guide elements being coupled together by a coupling wherein the first spherical guide section of one of the adjacent guide elements overlies the second spherical guide section of the other of the adjacent guide elements and so as to permit relative rotation therebetween, a terminal mounting element which defines an internal guide area and which includes a radially outwardly extending mounting collar at one end and a coupling section at the other end which has the configuration of a segment of a sphere, said coupling section overlying the first or second spherical guide section of an endmost one of the guide elements in the chain so as to be coupled thereto while permitting relative rotation therebetween, a hollow guide section, means joining the collar of the terminal mounting element to the hollow guide section so that at least one energy conducting line can be positioned to extend along the central guide area of the guide chain, through the internal guide area of the terminal mounting element, and then along said hollow guide section, and wherein the hollow guide section is of generally rectangular outline and includes depending outer side walls, with said depending outer side walls having aligned, inwardly directed lips, and wherein the collar of the terminal mounting element is rectangular and sized to be received between said depending side walls with the clamping lips underlying the collar so as to retain the terminal mounting element.

21. A modular energy conducting guide chain structure for guiding at least one energy conducting line, comprising a guide chain comprising a plurality of guide elements, with each of the guide elements comprising a generally tubular body which defines a longitudinally extending central guide area which is adapted to receive at least one energy conducting line, and which includes first and second longitudinally aligned guide sections which are joined by an intermediate joint section, and with the first and second guide sections each having the configuration of a segment of a sphere, said guide elements being serially arranged and with adjacent guide elements being coupled together by a coupling wherein the first spherical guide section of one of the adjacent guide elements overlies the second spherical guide section of the other of the adjacent guide elements and so as to permit relative rotation therebetween, a terminal mounting element which defines an internal guide area and which includes a radially outwardly extending mounting collar at one end and a coupling section at the other end which has the configuration of a segment of a sphere, said coupling section overlying the first or second spherical guide section of an endmost one of the guide elements in the chain so as to be coupled thereto while permitting relative rotation therebetween, a hollow guide section, means joining the collar of the terminal mounting element to the hollow guide section so that at least one energy conducting line can be positioned to extend along the central guide area of the guide chain, through the internal guide area of the terminal mounting element, and then along said hollow guide section, and wherein the hollow guide section is of generally circular outline, and said modular structure further comprises an adapter for interconnecting the terminal mounting element with the hollow guide section so that the one energy conducting line can extend from the terminal mounting element, through the adapter, and then along the hollow guide section.

22. A modular energy conducting guide chain structure for guiding at least one energy conducting line, comprising a guide chain comprising a plurality of guide elements, with each of the guide elements comprising a generally tubular body which defines a longitudinally extending central guide area which is adapted to receive at least one energy conducting line, and which includes first and second longitudinally aligned guide sections which are joined by an intermediate joint section, and with the first and second guide sections each having the configuration of a segment of a sphere, said guide elements being serially arranged and with adjacent guide elements being coupled together by a coupling wherein the first spherical guide section of one of the adjacent guide elements overlies the second spherical guide section of the other of the adjacent guide elements and so as to permit relative rotation therebetween, a terminal mounting element which defines an internal guide area and which includes a radially outwardly extending mounting collar at one end and a coupling section at the other end which has the configuration of a segment of a sphere, said coupling section overlying the first or second spherical guide section of an endmost one of the guide elements in the chain so as to be coupled thereto while permitting relative rotation therebetween, a hollow guide section, means joining the collar of the terminal mounting element to the hollow guide section so that at least one energy conducting line can be positioned to extend along the central guide area of the guide chain, through the internal guide area of the terminal mounting element, and then along said hollow guide section, and further comprising means for relieving the pull of the at least one line through the modular structure.

* * * * *